(12) United States Patent
Pun et al.

(10) Patent No.: US 12,725,349 B2
(45) Date of Patent: Sep. 1, 2026

(54) DEFERRED NEURAL LIGHTING IN AUGMENTED IMAGE GENERATION

(71) Applicant: WAABI Canada Inc., Toronto (CA)

(72) Inventors: Ava Pun, Waterloo (CA); Gary Sun, Waterloo (CA); Jingkang Wang, Toronto (CA); Yun Chen, Toronto (CA); Ze Yang, Toronto (CA); Sivabalan Manivasagam, Toronto (CA); Wei-Chiu Ma, Cambridge (CA); Raquel Urtasun, Toronto (CA)

(73) Assignee: WAABI Canada Inc., Toronto (CA)

( * ) Notice: Subject to any disclaimer, the term of this patent is extended or adjusted under 35 U.S.C. 154(b) by 88 days.

(21) Appl. No.: 18/666,728

(22) Filed: May 16, 2024

(65) Prior Publication Data

US 2024/0386656 A1 Nov. 21, 2024

Related U.S. Application Data

(60) Provisional application No. 63/466,996, filed on May 16, 2023.

(51) Int. Cl.
*G06T 15/50* (2011.01)
*G06N 20/00* (2019.01)
*G06T 19/00* (2011.01)

(52) U.S. Cl.
CPC ........... *G06T 15/506* (2013.01); *G06N 20/00* (2019.01); *G06T 19/006* (2013.01)

(58) Field of Classification Search
CPC ..... G06T 15/506; G06T 19/006; G06N 20/00; G06N 3/045
See application file for complete search history.

(56) References Cited

U.S. PATENT DOCUMENTS 9,036,943 B1 * 5/2015 Baldwin .................. G06T 7/38 382/284
11,308,669 B1 * 4/2022 Nguyen .................. G06T 11/60
12,513,404 B2 * 12/2025 Gausebeck .......... H04N 23/698
2019/0108686 A1 * 4/2019 Spivack ............ G06Q 30/0277
(Continued)

OTHER PUBLICATIONS

Wang, Z., et al., "Neural Light Field Estimation for Street Scenes with Differentiable Virtual Object Insertion", Aug. 19, 2022, 17 pages.
(Continued)

*Primary Examiner* — Grace Q Li
(74) *Attorney, Agent, or Firm* — Lathrop GPM LLP

(57) ABSTRACT

Deferred neural lighting in augmented image generation includes performing operations. The operations include generating a source light representation of a real-world scene from a panoramic image of the real-world scene, augmenting the real-world scene in an object representation of the real-world scene to generate an augmented scene, and processing the augmented scene to generate augmented image buffers. The operations further include selecting a target lighting representation identifying a target light source, processing, by a neural deferred rendering model, the augmented image buffers, the source lighting representation, and a target lighting representation to generate an augmented image having a lighting appearance according to the target light source and outputting the augmented image.

16 Claims, 12 Drawing Sheets

(56) References Cited

U.S. PATENT DOCUMENTS

| | | | | |
|---|---|---|---|---|
| 2020/0151509 | A1* | 5/2020 | Sunkavalli | G06V 10/82 |
| 2024/0054720 | A1* | 2/2024 | Fidler | G06T 7/586 |

OTHER PUBLICATIONS

Rudnev, V., et al., "NeRF for Outdoor Scene Relighting", Jul. 21, 2022, 17 pages.

Wang, Z., et al., "Neural Fields meet Explicit Geometric Representations for Inverse Rendering of Urban Scenes", Apr. 6, 2023, 11 pages.

Tang, J., et al., "Estimating Spatially-Varying Lighting in Urban Scenes with Disentangled Representation", Nov. 11, 2022, 16 apges.

* cited by examiner

804

806

DEFERRED NEURAL LIGHTING IN AUGMENTED IMAGE GENERATION

CROSS-REFERENCE TO RELATED APPLICATIONS

This application is a non-provisional application of, and thereby claims benefit under 35 U.S.C. § 119(e) to U.S. Patent Application Ser. No. 63/466,996 filed on May 16, 2023, which is incorporated herein by reference in its entirety.

BACKGROUND

A virtual world is a computer-simulated environment, which enables a player to interact in a three-dimensional space as if the player were in the real world. In some cases, the virtual world is designed to replicate at least some aspects of the real world. For example, the virtual world may include objects and background reconstructed from the real world. The reconstructing of objects and background from the real world allows the system to replicate aspects of the real world.

For example, one way to bring realism is by obtaining sensor data from the real world describing a scenario, modifying the scenario to create an augmented scenario, and then allowing the player to interact with the augmented scenario. When the player interacts with the augmented scenario, different objects may be in different relative positions than in the real world. Thus, in order to modify the real world, an accurate set of models should be created and used in the virtual world.

A problem in generating an augmented image is that the shadows of the generated image should also match the augmentation. Namely, the lighting should be realistic.

SUMMARY

In general, in one aspect, one or more embodiments relate to a computer-implemented method. The computer-implemented method includes generating a source light representation of a real-world scene from a panoramic image of the real-world scene, augmenting the real-world scene in an object representation of the real-world scene to generate an augmented scene, and processing the augmented scene to generate augmented image buffers. The computer implemented method further includes selecting a target lighting representation identifying a target light source, processing, by a neural deferred rendering model, the augmented image buffers, the source lighting representation, and a target lighting representation to generate an augmented image having a lighting appearance according to the target light source, and outputting the augmented image.

In general, in one aspect, one or more embodiments relate to a system that includes memory and a computer processor that includes computer readable program code for performing operations. The operations include generating a source light representation of a real-world scene from a panoramic image of the real-world scene, augmenting the real-world scene in an object representation of the real-world scene to generate an augmented scene, and processing the augmented scene to generate augmented image buffers. The operations further include selecting a target lighting representation identifying a target light source, processing, by a neural deferred rendering model, the augmented image buffers, the source lighting representation, and a target lighting representation to generate an augmented image having a lighting appearance according to the target light source and outputting the augmented image.

In general, in one aspect, one or more embodiments relate to a non-transitory computer readable medium that includes computer readable program code for performing operations. The operations include generating a source light representation of a real-world scene from a panoramic image of the real-world scene, augmenting the real-world scene in an object representation of the real-world scene to generate an augmented scene, and processing the augmented scene to generate augmented image buffers. The operations further include selecting a target lighting representation identifying a target light source, processing, by a neural deferred rendering model, the augmented image buffers, the source lighting representation, and a target lighting representation to generate an augmented image having a lighting appearance according to the target light source and outputting the augmented image.

Other aspects of the invention will be apparent from the following description and the appended claims.

BRIEF DESCRIPTION OF DRAWINGS

Like elements in the various figures are denoted by like reference numerals for consistency.

DETAILED DESCRIPTION

Figure 1:
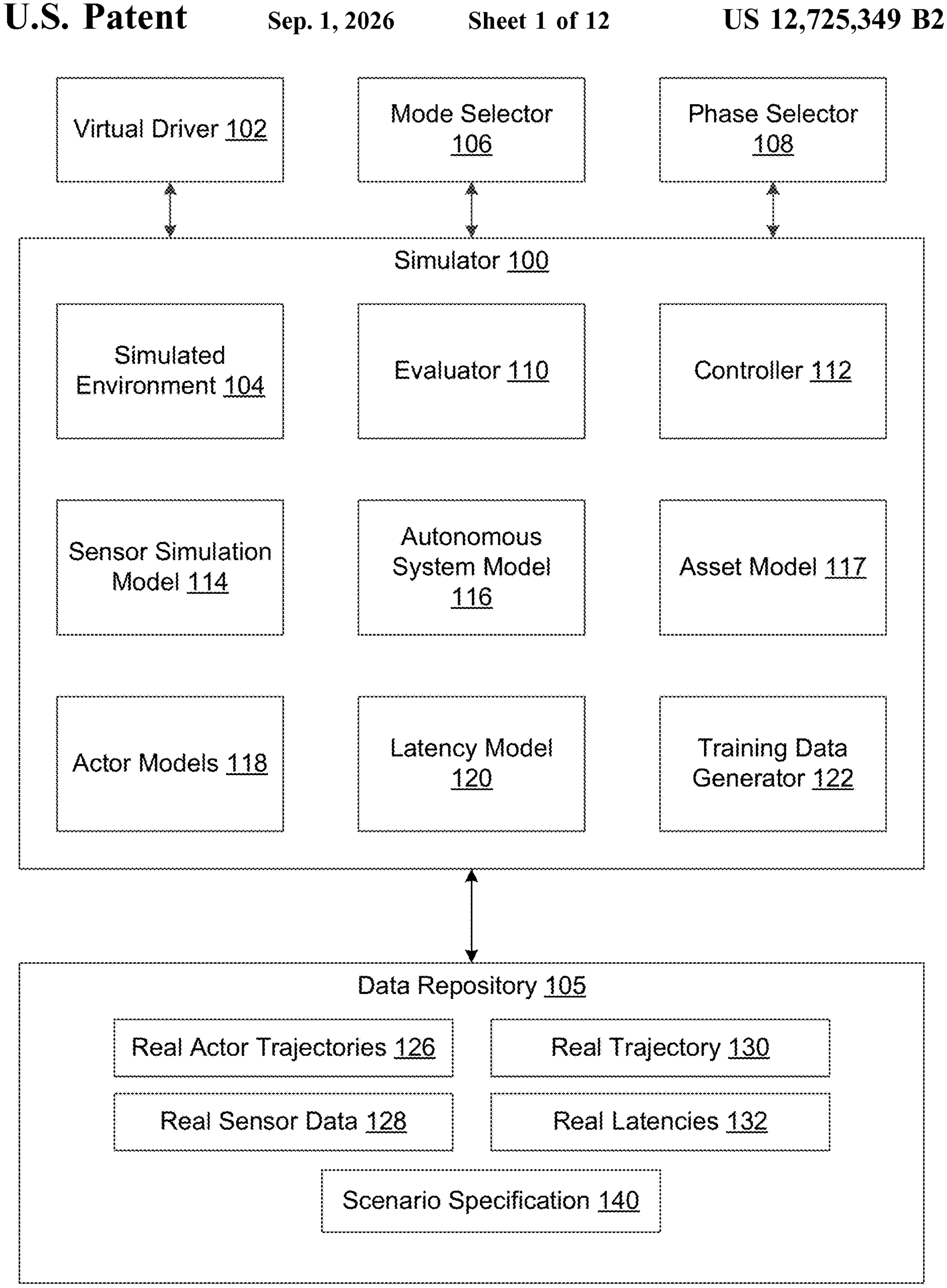
FIG. 1 shows a diagram of an autonomous training and testing system in accordance with one or more embodiments.

In general, embodiments are directed to deferred neural lighting in augmented image generation. The real world is reconstructed in the virtual world in a manner that allows for subsequent manipulation and control of the reconstruction. Changes in the virtual world may be the addition, deletion, or position change of one or more actors in the virtual world as well as the perspective of the agent. Additional changes may include changes in the lighting conditions, such as the position and intensity of the sun in the sky. For example, different lighting conditions in the real world may cause changes in the shadows or in the amount of glare off of objects.

One or more embodiments build a lighting-aware digital twin at scale from the sensor data of a real-world scene. The lighting-aware digital twin includes dynamic actors and static background with accurate geometry, appearance, and estimated scene lighting. The digital twin of the real-world scene enables actor insertion, modification, removal, and rendering from a new viewpoint, in a lighting-aware manner to generate an augmented scene. The augmented scene is rendered in a physically based manner to generate augmented image buffers of an augmented image. A target lighting representation is selected that may modify the lighting of the real-world scene. Then, using the augmented image buffers, the source, and target lighting representations, the augmented scene is relit using a neural network model to generate an augmented image. Thus, rather than performing the final lighting of the augmented scene when rendering the augmented image buffers, the lighting of the scene is deferred to after the image buffers are generated by a neural network model.

As shown, one or more embodiments may be used to perform realistic relighting of modified scenes, such as altering the sun location and modifying the shadows or changing the sun brightness, producing spatially consistent and temporally consistent camera videos.

In one or more embodiments, the processing by the system may be used to generate a virtual world that mimics the real world, but with different scenarios implemented. For example, the changed scenarios may be that the dynamic and/or static objects are in different locations, the perspective of the player is changed because the player is in a different location than the player was in the real world, or other aspects of the real world are different.

Embodiments of the invention may be used as part of generating a simulated environment for the training and testing of autonomous systems. An autonomous system is a self-driving mode of transportation that does not require a human pilot or human driver to move and react to the real-world environment. Rather, the autonomous system includes a virtual driver that is the decision-making portion of the autonomous system. The virtual driver is an artificial intelligence system that learns how to interact in the real world. The autonomous system may be completely autonomous or semi-autonomous. As a mode of transportation, the autonomous system is contained in a housing configured to move through a real-world environment. Examples of autonomous systems include self-driving vehicles (e.g., self-driving trucks and cars), drones, airplanes, robots, etc. The virtual driver is the software that makes decisions and causes the autonomous system to interact with the real-world including moving, signaling, and stopping or maintaining a current state.

The real-world environment is the portion of the real world through which the autonomous system, when trained, is designed to move. Thus, the real-world environment may include interactions with concrete and land, people, animals, other autonomous systems, human driven systems, construction, and other objects as the autonomous system moves from an origin to a destination. In order to interact with the real-world environment, the autonomous system includes various types of sensors, such as LiDAR sensors, which are used to obtain measurements of the real-world environment, and cameras that capture images from the real-world environment.

The testing and training of the virtual driver of the autonomous systems in the real-world environment is unsafe because of the accidents that an untrained virtual driver can cause. Thus, the augmented images generated using the claimed techniques and shown in FIG. 4 and FIG. 6 may be provided as part of a video to a virtual camera of an autonomous system. The player in the example is the virtual driver of the autonomous system and the perspective of the augmented images in the video is based on the position of the virtual camera in the virtual world.

The testing and training of a virtual driver may be performed using the simulator (100) described in FIG. 1. As shown in FIG. 1, a simulator (100) is configured to train and test a virtual driver (102) of an autonomous system. For example, the simulator (100) may be a unified, modular, mixed reality, closed-loop simulator for autonomous systems. The simulator (100) is a configurable simulation framework that enables not only evaluation of different autonomy components in isolation, but also as a complete system in a closed-loop manner. The simulator reconstructs "digital twins" of real-world scenarios automatically, enabling accurate evaluation of the virtual driver at scale. The simulator (100) may also be configured to perform mixed-reality simulation that combines real world data and simulated data to create diverse and realistic evaluation variations to provide insight into the virtual driver's performance. The mixed reality closed-loop simulation allows the simulator (100) to analyze the virtual driver's (102) action on counterfactual "what-if" scenarios that did not occur in the real-world. The simulator (100) further includes functionality to simulate and train on rare yet safety-critical scenarios with respect to the entire autonomous system and closed-loop training to enable automatic and scalable improvement of autonomy.

The simulator (100) creates the simulated environment (104) which is a virtual world. The virtual driver (102) is the player in the virtual world. The simulated environment (104) is a simulation of a real-world environment, which may or may not be in actual existence, in which the autonomous system is designed to move. As such, the simulated environment (104) includes a simulation of the objects (i.e., simulated objects or assets) and background in the real world, including the natural objects, construction, buildings and roads, obstacles, as well as other autonomous and non-autonomous objects. The simulated environment (104) simulates the environmental conditions within which the autonomous system may be deployed. Additionally, the simulated environment (104) may be configured to simulate various weather conditions that may affect the inputs to the autonomous systems. The simulated objects may include both stationary and non-stationary objects. Non-stationary objects are actors in the real-world environment.

The simulator (100) also includes an evaluator (110). The evaluator (110) is configured to train and test the virtual driver (102) by creating various scenarios in the simulated environment (104). Each scenario is a configuration of the simulated environment (104) including, but not limited to, static portions, movement of simulated objects, actions of the simulated objects with each other, and reactions to actions taken by the autonomous system and simulated objects. The evaluator (110) is further configured to evaluate the performance of the virtual driver (102) using a variety of metrics.

The evaluator (110) assesses the performance of the virtual driver (102) throughout the performance of the scenario. Assessing the performance may include applying rules. For example, the rules may be that the automated system does not collide with any other actor, compliance with safety and comfort standards (e.g., passengers not experiencing more than a certain acceleration force within the vehicle), the automated system not deviating from executed trajectory, or other rule. Each rule may be associated with the metric information that relates a degree of breaking the rule with a corresponding score. The evaluator (110) may be implemented as a data-driven neural network that learns to distinguish between good and bad driving behavior. The various metrics of the evaluation system may be leveraged to determine whether the automated system satisfies the requirements of the success criterion for a particular scenario. Further, in addition to system level performance, for modular based virtual drivers, the evaluator (110) may also evaluate individual modules such as segmentation or prediction performance for actors in the scene with respect to the ground truth recorded in the simulator (100).

The simulator (100) is configured to operate in multiple phases as selected by the phase selector (108) and modes as selected by a mode selector (106). The phase selector (108) and mode selector (106) may be a graphical user interface or application programming interface component that is configured to receive a selection of phase and mode, respectively. The selected phase and mode define the configuration of the simulator (100). Namely, the selected phase and mode define which system components communicate and the operations of the system components.

The phase may be selected using a phase selector (108). The phase may be a training phase or a testing phase. In the training phase, the evaluator (110) provides metric information to the virtual driver (102), which uses the metric information to update the virtual driver (102). The evaluator (110) may further use the metric information to further train the virtual driver (102) by generating scenarios for the virtual driver (102). In the testing phase, the evaluator (110) does not provide the metric information to the virtual driver (102). In the testing phase, the evaluator (110) uses the metric information to assess the virtual driver (102) and to develop scenarios for the virtual driver (102).

The mode may be selected by the mode selector (106). The mode defines the degree to which real-world data is used, whether noise is injected into simulated data, the degree of perturbations of real-world data, and whether the scenarios are designed to be adversarial. Example modes include open loop simulation mode, closed loop simulation mode, single module closed loop simulation mode, fuzzy mode, and adversarial mode. In an open loop simulation mode, the virtual driver is evaluated with real world data. In a single module closed loop simulation mode, a single module of the virtual driver is tested. An example of a single module closed loop simulation mode is a localizer closed loop simulation mode in which the simulator evaluates how the localizer estimated pose drifts over time as the scenario progresses in simulation. In a training data simulation mode, the simulator is used to generate training data. In a closed loop evaluation mode, the virtual driver and simulation system are executed together to evaluate system performance. In the adversarial mode, the actors are modified to perform adversarial. In the fuzzy mode, noise is injected into the scenario (e.g., to replicate signal processing noise and other types of noise). Other modes may exist without departing from the scope of the system.

The simulator (100) includes the controller (112) which includes functionality to configure the various components of the simulator (100) according to the selected mode and phase. Namely, the controller (112) may modify the configuration of each of the components of the simulator (100) based on the configuration parameters of the simulator (100). Such components include the evaluator (110), simulated environment (104), autonomous system model (116), sensor simulation models (114), asset models (117), actor models (118), latency models (120), and a training data generator (122).

The autonomous system model (116) is a detailed model of the autonomous system in which the virtual driver (102) will execute. The autonomous system model (116) includes model, geometry, physical parameters (e.g., mass distribution, points of significance), engine parameters, sensor locations and type, the firing pattern of the sensors, information about the hardware on which the virtual driver executes (e.g., processor power, amount of memory, and other hardware information), and other information about the autonomous system. The various parameters of the autonomous system model may be configurable by the user or another system.

For example, if the autonomous system is a motor vehicle, the modeling and dynamics may include the type of vehicle (e.g., car, truck), make and model, geometry, physical parameters such as the mass distribution, axle positions, type and performance of the engine, etc. The vehicle model may also include information about the sensors on the vehicle (e.g., camera, LiDAR, etc.), the sensors' relative firing synchronization pattern, and the sensors' calibrated extrinsics (e.g., position and orientation) and intrinsics (e.g., focal length). The vehicle model also defines the onboard computer hardware, sensor drivers, controllers, and the autonomy software release under test.

The autonomous system model (116) includes an autonomous system dynamic model. The autonomous system dynamic model is used for dynamics simulation that takes the actuation actions of the virtual driver (e.g., steering angle, desired acceleration) and enacts the actuation actions on the autonomous system in the simulated environment (104) to update the simulated environment (104) and the state of the autonomous system. To update the state, a kinematic motion model may be used, or a dynamics motion model that accounts for the forces applied to the vehicle may be used to determine the state. Within the simulator, with access to real log scenarios with ground truth actuations and vehicle states at each time step, embodiments may also optimize analytical vehicle model parameters or learn parameters of a neural network that infers the new state of the autonomous system given the virtual driver outputs.

In one or more embodiments, the sensor simulation model (114) models, in the simulated environment, active and passive sensor inputs. Passive sensor inputs capture the visual appearance of the simulated environment (104) including stationary and nonstationary simulated objects from the perspective of one or more cameras based on the simulated position of the camera(s) within the simulated environment (104). Examples of passive sensor inputs include inertial measurement unit (IMU) and thermal. Active sensor inputs are inputs to the virtual driver of the autonomous system from the active sensors, such as LiDAR, RADAR, global positioning system (GPS), ultrasound, etc. Namely, the active sensor inputs include the measurements taken by the sensors, and the measurements being simulated based on the simulated environment based on the simulated position of the sensor(s) within the simulated environment. By way of an example, the active sensor measurements may be measurements that a LiDAR sensor would make of the simulated environment over time and in relation to the movement of the autonomous system. In one or more embodiments, all or a portion of the sensor simulation model (114) may be or include the rendering system (300) shown in FIG. 3 and FIG. 4. In such a scenario, the rendering system (300) of the sensor simulation models (114) may perform the operations of FIG. 5 and FIG. 6.

The sensor simulation model (114) is configured to simulate the sensor observations of the surrounding scene in the simulated environment (104) at each time step according to the sensor configuration on the vehicle platform. When the simulated environment directly represents the real-world environment, without modification, the sensor output may be directly fed into the virtual driver (102). For light-based sensors, the sensor model simulates light as rays that interact with objects in the scene to generate the sensor data. Depending on the asset representation (e.g., of stationary and nonstationary objects), embodiments may use graphics-based rendering for assets with textured meshes, neural rendering, or a combination of multiple rendering schemes. Leveraging multiple rendering schemes enables customizable world building with improved realism. Because assets are compositional in 3D and support a standard interface of render commands, different asset representations may be composed in a seamless manner to generate the final sensor data. Additionally, for scenarios that replay what happened in the real world and use the same autonomous system as in the real world, the original sensor observations may be replayed at each time step.

Asset models (117) include multiple models, each model modeling a particular type of individual asset in the real world. The assets may include inanimate objects such as construction barriers or traffic signs, parked cars, and background (e.g., vegetation or sky). Each of the entities in a scenario may correspond to an individual asset. As such, an asset model (117), or instance of a type of asset model (117), may exist for each of the objects or assets in the scenario. The assets can be composed together to form the three-dimensional simulated environment. An asset model (117) provides all the information needed by the simulator to simulate the asset. The asset model (117) provides the information used by the simulator (100) to represent and simulate the asset in the simulated environment (104).

Closely related to, and possibly considered part of the set of asset models (117) are actor models (118). An actor model (118) represents an actor in a scenario. An actor is a sentient being that has an independent decision-making process. Namely, in the real world, the actor may be an animate being (e.g., a person or animal) that makes a decision based on an environment or may be another autonomous system. The actor makes active movement rather than or in addition to passive movement. An actor model (118), or an instance of an actor model (118) may exist for each actor in a scenario. The actor model (118) is a model of the actor. If the actor is in a mode of transportation, then the actor model (118) includes the model of transportation mode in which the actor is located. For example, actor models may represent pedestrians, children, vehicles being driven by drivers, pets, bicycles, and other types of actors.

The actor model leverages the scenario specification and assets to control all actors in the scene and the actor's actions at each time step. The actor's behavior is modeled in a region of interest centered around the autonomous system. Depending on the scenario specification, the actor simulation controls the actors in the simulation to achieve the desired behavior. Actors can be controlled in various ways. One option is to leverage heuristic actor models, such as an intelligent-driver model (IDM) that try to maintain a certain relative distance or time-to-collision (TTC) from a lead actor or heuristic-derived lane-change actor model. Another is to directly replay actor trajectories from a real log or to control the actor(s) with a data-driven traffic model. Through the configurable design, embodiments may mix and match different subsets of actors to be controlled by different behavior models. For example, far-away actors that initially may not interact with the autonomous system and can follow a real log trajectory, but when near the vicinity of the autonomous system may switch to a data-driven actor model. In another example, actors may be controlled by a heuristic or data-driven actor model that still conforms to the high-level route in a real-log. This mixed-reality simulation provides control and realism.

Further, actor models may be configured to be in cooperative or adversarial mode. In cooperative mode, the actor model models actors to act rationally in response to the state of the simulated environment. In adversarial mode, the actor model may model actors acting irrationally, such as exhibiting road rage and bad driving.

In one or more embodiments, the actor models (118), asset model (117), and background may be part of the rendering system (described below with reference to FIG. 3 and FIG. 4). As another example, the system may be a bifurcated system whereby the operations (e.g., trajectories or positioning) of the assets and actors are defined separately from the appearance, which is part of the rendering system.

The latency model (120) represents timing latency that occurs when the autonomous system is in a real-world environment. Several sources of timing latency may exist. For example, a latency may exist from the time that an event occurs to the sensors detecting the sensor information from the event and sending the sensor information to the virtual driver. Another latency may exist based on the difference between the computing hardware executing the virtual driver in the simulated environment as compared to the computing hardware of the virtual driver. Further, another timing latency may exist between the time that the virtual driver transmits an actuation signal to the autonomous system changing (e.g., direction or speed) based on the actuation signal. The latency model (120) models the various sources of timing latency.

Stated another way, in the real world, safety-critical decisions in the real world may involve fractions of a second affecting response time. The latency model simulates the exact timings and latency of different components of the onboard system. To enable scalable evaluation without strict requirements on exact hardware, the latencies and timings of the different components of the autonomous system and sensor modules are modeled while running on different computer hardware. The latency model may replay latencies recorded from previously collected real-world data or have a data-driven neural network that infers latencies at each time step to match the hardware in a loop simulation setup.

The training data generator (122) is configured to generate training data. For example, the training data generator (122) may modify real-world scenarios to create new scenarios. The modification of real-world scenarios is referred to as mixed reality. For example, mixed-reality simulation may involve adding in new actors with novel behaviors, changing the behavior of one or more of the actors from the real-world, and modifying the sensor data in that region while keeping the remainder of the sensor data the same as the original log. In some cases, the training data generator (122) converts a benign scenario into a safety-critical scenario.

The simulator (100) is connected to a data repository (105). The data repository (105) is any type of storage unit or device that is configured to store data. The data repository (105) includes data gathered from the real world. For example, the data gathered from the real world includes real actor trajectories (126), real sensor data (128), real trajectories of the system capturing the real world (130), and real latencies (132). Each of the real actor trajectories (126), real sensor data (128), real trajectory of the system capturing the real world (130), and real latencies (132) is data captured by or calculated directly from one or more sensors from the real world (e.g., in a real-world log). In other words, the data gathered from the real-world are actual events that happened in real life. For example, in the case that the autonomous system is a vehicle, the real-world data may be captured by a vehicle driving in the real world with sensor equipment.

Further, the data repository (105) includes functionality to store one or more scenario specifications (140). A scenario specification (140) specifies a scenario and evaluation setting for testing or training the autonomous system. For example, the scenario specification (140) may describe the initial state of the scene, such as the current state of the autonomous system (e.g., the full 6D pose, velocity and acceleration), the map information specifying the road layout, and the scene layout specifying the initial state of all the dynamic actors and objects in the scenario. The scenario specification may also include dynamic actor information describing how the dynamic actors in the scenario should evolve over time which are inputs to the actor models. The dynamic actor information may include route information for the actors, desired behaviors or aggressiveness. The scenario specification (140) may be specified by a user, programmatically generated using a domain-specification language (DSL), procedurally generated with heuristics from a data-driven algorithm, or adversarial-based generation. The scenario specification (140) can also be conditioned on data collected from a real-world log, such as taking place on a specific real-world map or having a subset of actors defined by their original locations and trajectories.

The interfaces between the virtual driver (102) and the simulator (100) match the interfaces between the virtual driver (102) and the autonomous system in the real world. For example, the sensor simulation model (114) and the virtual driver (102) match the virtual driver (102) interacting with the sensors in the real world. The virtual driver (102) is the actual autonomy software that executes on the autonomous system. The simulated sensor data that is output by the sensor simulation model (114) may be in or converted to the exact message format that the virtual driver takes as input as if the virtual driver were in the real world, and the virtual driver can then run as a black box virtual driver with the simulated latencies incorporated for components that run sequentially. The virtual driver (102) then outputs the exact same control representation that it uses to interface with the low-level controller on the real autonomous system. The autonomous system model (116) will then update the state of the autonomous system in the simulated environment (104). Thus, the various simulation models of the simulator (100) run in parallel asynchronously at their own frequencies to match the real-world setting.

Figure 2:
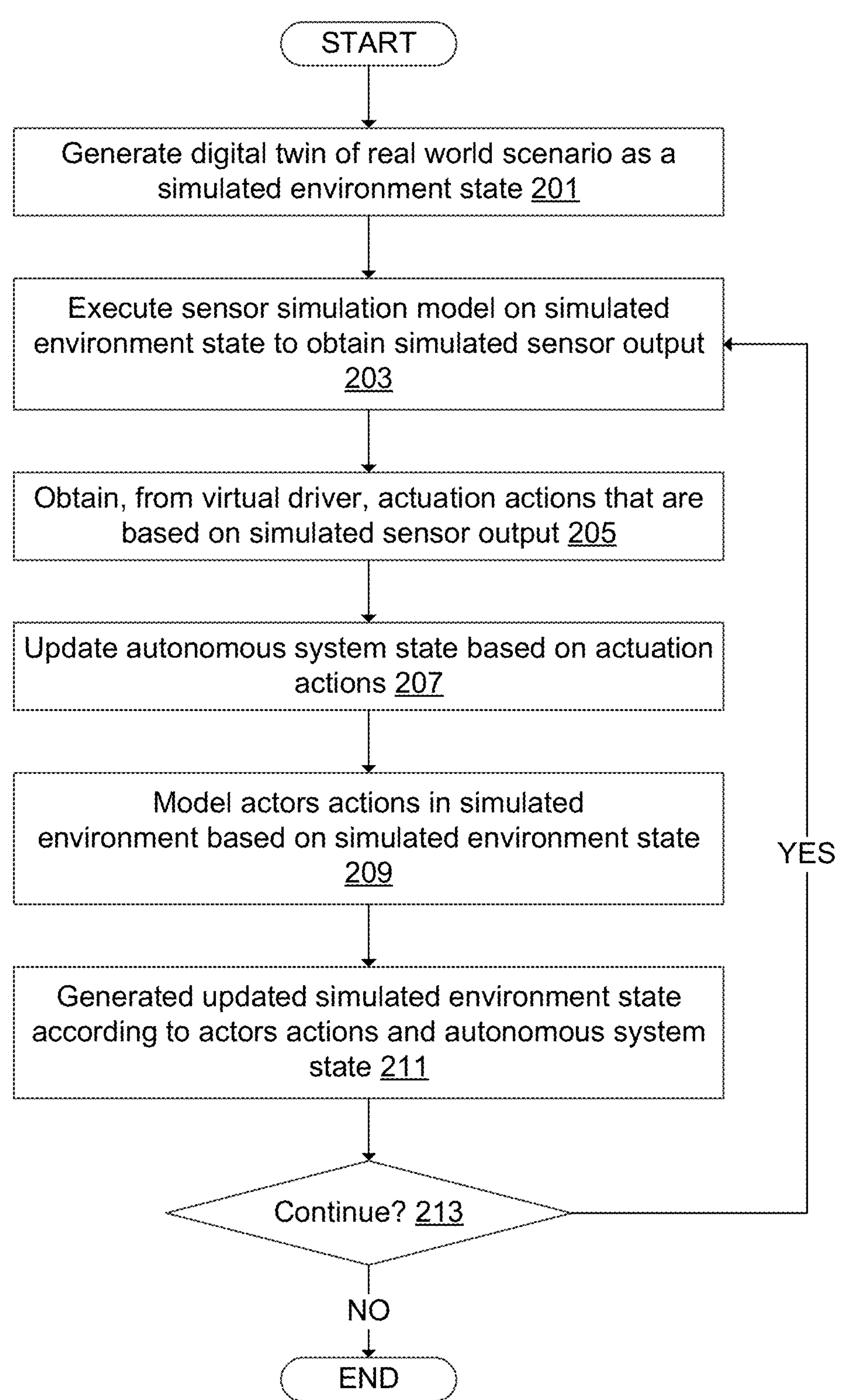
FIG. 2 shows a flowchart of the autonomous training and testing system in accordance with one or more embodiments.

FIG. 2 shows a flow diagram for executing the simulator in a closed loop mode. In Block 201, a digital twin of a real-world scenario is generated as a simulated environment state. Log data from the real world is used to generate an initial virtual world. The log data defines which asset and actor models are used in the initial positioning of assets. For example, using convolutional neural networks on the log data, the various asset types within the real world may be identified. As other examples, offline perception systems and human annotations of log data may be used to identify asset types. Accordingly, corresponding asset and actor modes may be identified based on the asset types and add to the positions of the real actors and assets in the real world. Thus, the asset and actor models create an initial three-dimensional virtual world.

Figure 5:
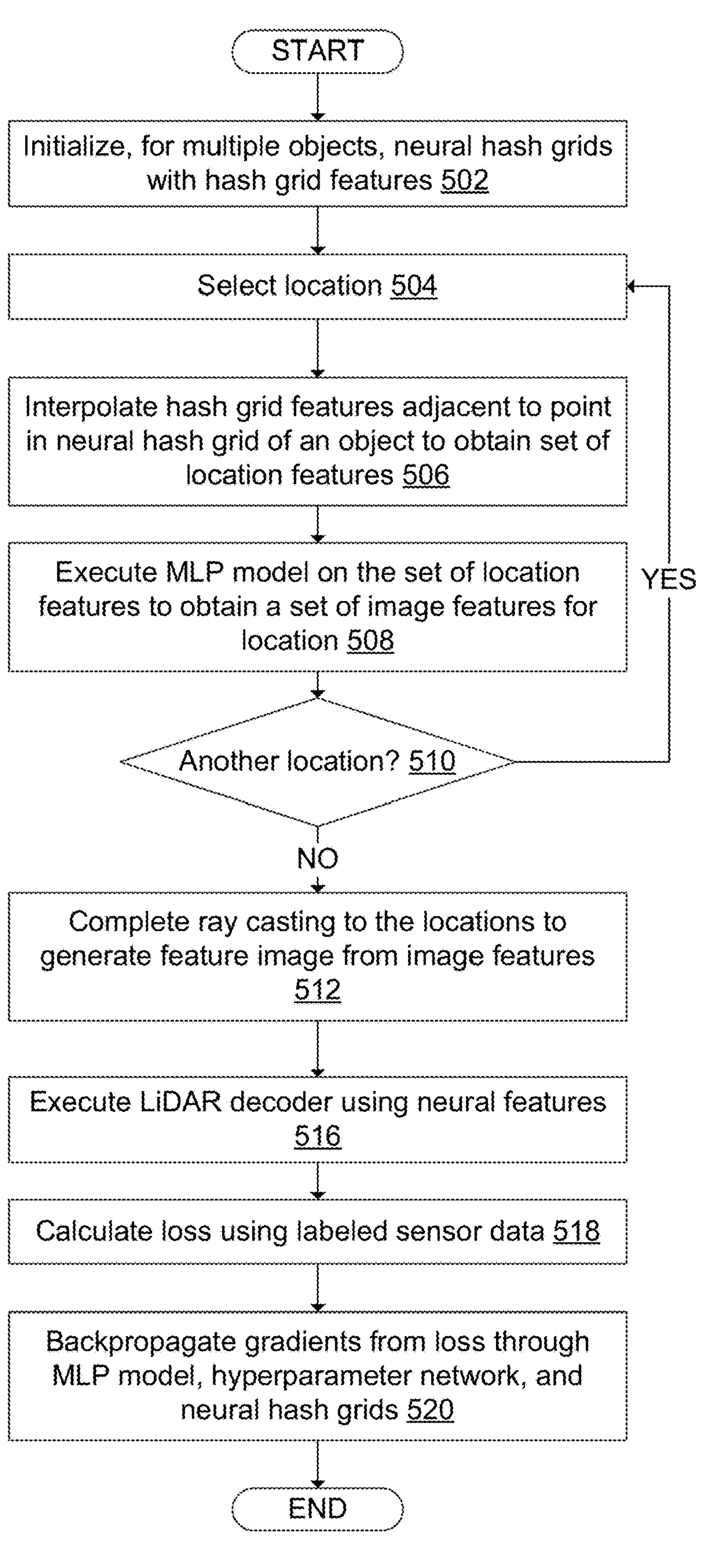
FIG. 5 shows a flowchart for neural hash grid training in accordance with one or more embodiments.
Figure 6:
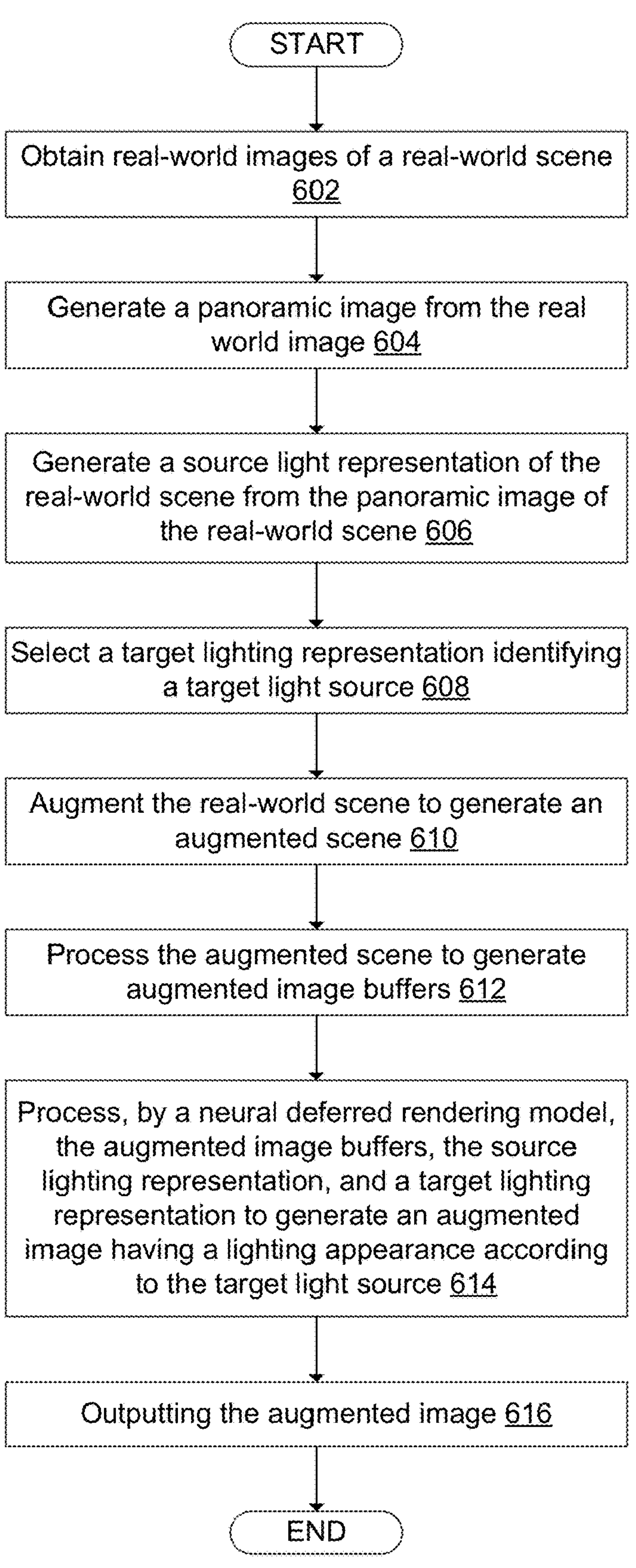
FIG. 6 shows a flowchart for deferred neural lighting in augmented image generation in accordance with one or embodiments.

In Block 203, the sensor simulation model is executed on the simulated environment state to obtain simulated sensor output. The sensor simulation model may use beamforming and other techniques to replicate the view to the sensors of the autonomous system. Each sensor of the autonomous system has a corresponding sensor simulation model and a corresponding system. The sensor simulation model executes based on the position of the sensor within the virtual environment and generates simulated sensor output. The simulated sensor output is in the same form as would be received from a real sensor by the virtual driver. In one or more embodiments, Block 203 may be performed as shown in FIG. 5 and FIG. 6 (described below) to generate camera output for a virtual camera. The processing of FIG. 5 and FIG. 6 may be performed for each of the virtual cameras on the autonomous system. Some of the operations may be performed once and the data generated reused for the different cameras or even for different scenarios. For example, the same generated source light representation may be used for generating augmented images for multiple cameras without regenerating the source light representation and for generating multiple different lighting scenarios. Similarly, the same selection of a target light representation may be used for multiple cameras. The operations of FIG. 5 and FIG. 6 may be performed for each camera and LiDAR sensor on the autonomous system to simulate the output of the corresponding camera and LiDAR sensor. Location and viewing direction of the sensor with respect to the autonomous vehicle may be used to replicate the originating location of the corresponding virtual sensor on the simulated autonomous system. Thus, the various sensor inputs to the virtual driver match the combination of inputs if the virtual driver were in the real world.

The simulated sensor output is passed to the virtual driver. In Block 205, the virtual drive executes based on the simulated sensor output to generate actuation actions. The actuation actions define how the virtual driver controls the autonomous system. For example, for a self-driving vehicle, the actuation actions may be the amount of acceleration, movement of the steering, triggering of a turn signal, etc. From the actuation actions, the autonomous system state in the simulated environment is updated in Block 207. The actuation actions are used as input to the autonomous system model to determine the actual actions of the autonomous system. For example, the autonomous system dynamic model may use the actuation actions in addition to road and weather conditions to represent the resulting movement of the autonomous system. For example, in a wet or snowy environment, the same amount of acceleration action as in a dry environment may cause less acceleration than in the dry environment. As another example, the autonomous system model may account for possibly faulty tires (e.g., tire slippage), mechanical based latency, or other possible imperfections in the autonomous system.

In Block 209, actors' actions in the simulated environment are modeled based on the simulated environment state. Concurrently with the virtual driver model, the actor models and asset models are executed on the simulated environment state to determine an update for each of the assets and actors in the simulated environment. Here, the actors' actions may use the previous output of the evaluator to test the virtual driver. For example, if the actor is adversarial, the evaluator may indicate based on the previous action of the virtual driver, the lowest scoring metric of the virtual driver. Using a mapping of metrics to actions of the actor model, the actor model executes to exploit or test that particular metric.

Thus, in Block 211, the simulated environment state is updated according to the actors' actions and the autonomous system state to generate an updated simulated environment state. The updated simulated environment includes the change in positions of the actors and the autonomous system. Because the models execute independently of the real world, the update may reflect a deviation from the real world. Thus, the autonomous system is tested with new scenarios. In Block 213, a determination is made whether to continue. If the determination is made to continue, testing of the autonomous system continues using the updated simulated environment state in Block 203. At each iteration, during training, the evaluator provides feedback to the virtual driver. Thus, the parameters of the virtual driver are updated to improve the performance of the virtual driver in a variety of scenarios. During testing, the evaluator is able to test using a variety of scenarios and patterns including edge cases that may be safety critical. Thus, one or more embodiments improve the virtual driver and increase the safety of the virtual driver in the real world.

As shown, the virtual driver of the autonomous system acts based on the scenario and the current learned parameters of the virtual driver. The simulator obtains the actions of the autonomous system and provides a reaction in the simulated environment to the virtual driver of the autonomous system. The evaluator evaluates the performance of the virtual driver and creates scenarios based on the performance. The process may continue as the autonomous system operates in the simulated environment.

Figure 3:
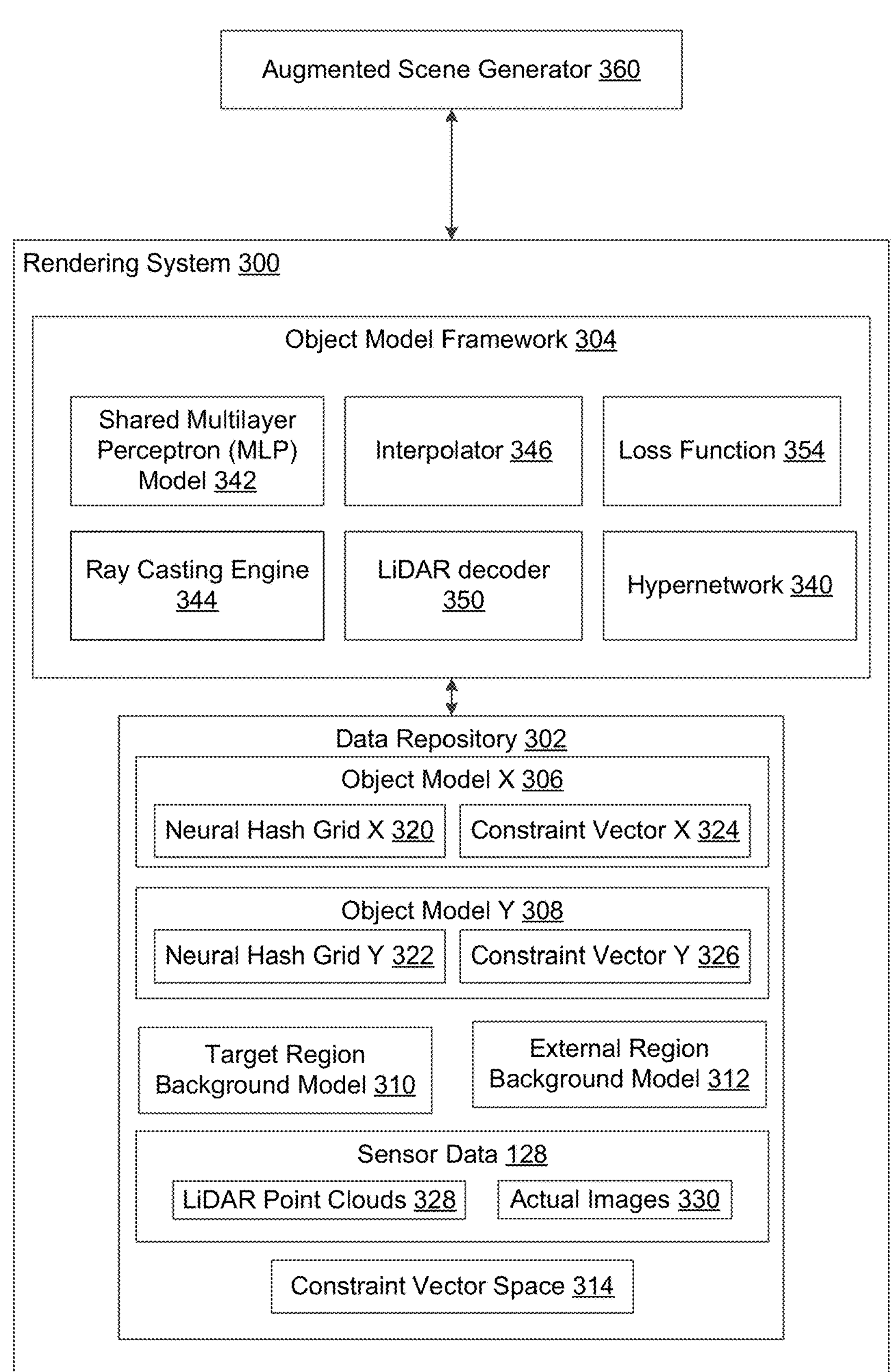
FIG. 3 shows a first diagram of a rendering system in accordance with one or more embodiments.

FIG. 3 shows a diagram of the rendering system (300) in accordance with one or more embodiments. The rendering system (300) is a system configured to generate virtual sensor input using neural hash grids for objects. In particular, the rendering system (300) may be configured to render camera images and LiDAR images. The rendering system (300) includes a data repository (302) connected to an object model framework (304). The data repository (302) includes sensor data (128), object models (e.g., object model X (306) and object model Y (308)), a target region background model (310), an external region background model (312), and a constraint vector space (314).

The rendering system (300) is configured to generate and adjust the neural hash grid. For a particular object, a neural hash grid is defined by hash grid features for the object. In one or more embodiments, both stationary and moving objects may be represented by respective neural hash grids. The neural hash grid features describe the target object. Ray casting may be performed to generate rendering buffers and render a LiDAR image. When ray casting is performed, the ray may intercept a location in the target object. To render the portion of the target object at the location, the neural hash features adjacent to the location are interpolated to generate location features. The location features are processed through a multilayer perceptron model (MLP) model to generate an object's appearance for the location. The ray casting is completed using the object's appearance to generate a feature image. Namely, the collection of rays simulates the player's view in the real world such that the player should have the same input as if the player were in a real world (i.e., if the virtual world were real).

The sensor data (128) is the sensor data described above with reference to FIG. 1. The sensor data (128) includes LiDAR point clouds (328) and actual images (330). LiDAR point clouds (328) are point clouds captured by LiDAR sensors performing a LiDAR sweep of a geographic region. Actual images (330) are real-world images captured by one or more cameras of the geographic region. The real-world images are images from physical cameras in the real world. For example, as a sensing vehicle is moving through a geographic region the sensing vehicle may have cameras and LiDAR sensors that gather sensor data from the geographic region. Notably, the sensor data (128) is the time series of data that is captured along the trajectory of the sensing vehicle. As such, the sensor data (128) generally omits several side views of three-dimensional objects. Thus, a challenge exists when performing closed loop simulation to generate a three-dimensional object model (e.g., object model X (306), object model Y (308)) of an object when several of the views of the object do not exist. For example, for many objects, certain sides of the objects may not have any sensor data, and other sides may only have sensor data from a perspective view (e.g., a perspective of the corner). By way of a more specific example, consider a sensing vehicle moving along a street. Cameras on the sensing vehicle can capture directly, the sides of other vehicles that are parked along the street as well as a small amount of the front and back of the parked vehicles that are not hidden. The camera may also capture images of another vehicle being driven in front of the sensing vehicle. When the other vehicle turns, the camera may capture a different side but does not capture the front. As such, the sensor data (128) is imperfect as it does not capture the three-hundred-and-sixty-degree view of the objects.

The object models (e.g., object model X (306), object model Y (308)) are three-dimensional object models of objects. The object models (e.g., object model X (306), object model Y (308)) each include a neural hash grid (e.g., neural hash grid X (320), neural hash grid Y (322)) and a constraint vector (e.g., constraint vector X (324), constraint vector Y (326)).

A neural hash grid (e.g., neural hash grid X (320), neural hash grid Y (322)) is a grid of neural network features generated for a corresponding object. Each location has a corresponding location in the neural hash grid, whereby the relative locations between two locations on the object match the relative locations of matching points in the neural hash grid. Stated another way, the neural hash grid is a scaled model of the object, whereby corresponding points have learned features from the object. In one or more embodiments, the neural hash grid has a hierarchy of resolutions. The hierarchy of resolutions may be defined by representing the model of the object as cubes containing sub-cubes. For example, at the lowest resolution, the object is represented by a first set of cubes, each cube having features defined for the entire cube. Each cube in the first set of cubes may be partitioned into sub-cubes (e.g., such as 9 sub-cubes). A sub-cube is a cube that is wholly contained in another cube. Each sub-cube has a set of features for the particular sub-cube that are features defined for the matching location in the object. Sub-cubes may each further be partitioned into sub-cubes, with a corresponding set of features defined, and the process may repeat to the lowest resolution. Each cube, regardless of the resolution, has a corresponding region on the object. By way of an example of a vehicle, at a first resolution, the vehicle may include individual cubes for each of the front, middle, and back of the vehicle. The cube for the middle region may include individual sub-cubes for the portions of the vehicle having the left side front door, the left side front window, the left side back door, and the left side back window, without specifically identifying or demarcating the doors, windows, handles, etc. The neural hash grid (e.g., neural hash grid X (320), neural hash grid Y (322)) is a feature grid learned from the real sensor data (128) and, as such, may not include direct attributes of color, luminosity, etc., but rather encoded features learned through machine learning.

The constraint vector (e.g., constraint vector X (324), constraint vector Y (326)) is a vector specific to the object model that is learned from multiple objects. The constraint vector serves to constrain the features of the object model. The constraint vector is defined by the constraint vector space (314). The constraint vector space is a shared representation of objects. Namely, the constraint vector space is learned from multiple objects and allows for cross usage of information between objects. By way of an example, the constraint vector space allows for a missing view from one object to be learned from the views of other objects. However, the objects may not be identical, and therefore not have identical features. For example, a red sportscar front cannot be copied onto a blue sport utility vehicle (SUV) and be accurate. Thus, the missing view is not a direct copy but rather learned from the combination of views of the other objects and its own features. As such, the constraint vector for an object as generated by the constraint vector space is an object prior that is used to generate the object model.

Continuing with FIG. 3, the target region background model (310) and the external region background models (312) defines different types of backgrounds. The target region background has the background objects that are within the region of interest (i.e., the target region) of the autonomous system. For example, the region of interest may be within one hundred and fifty meters in front of the autonomous system, forty meters behind the autonomous system, and twenty meters on each side of the autonomous system. The target region background model (310) may represent the entire target region as described above with reference to the object models. However, in the target region background model, rather than representing individual objects, the whole target region or specific sub-regions thereof may be captured in the same model.

The external region background model (312) is a background model of anything outside of the target region. Outside of or external to refers to locations that are geographically farther than the current target region. In the above example, the external region is the region farther than one hundred and fifty meters in front of the autonomous system, forty meters behind the autonomous system, and twenty meters on each side of the autonomous system. For the external region background model (312), the region may be represented through an inverted sphere. Spherical projections or optimizations may be used as the external region background model.

The object model framework (304) is configured to generate the object models and perform the neural hash grid sensor simulation. The object model framework (304) includes a hypernetwork (340), a shared multi-layer perceptron model (342), a ray casting engine (344), an interpolator (346), a LiDAR decoder (350), a loss function (354), and a trajectory refinement model (356).

The hypernetwork (340) is an MLP network configured to generate the actor neural hash grids representation from the constraint vector space (314). In one or more embodiments, the hypernetwork (340) is learned across the object models.

The shared MLP model (342) is an MLP model that is configured to generate geometric and appearance features from the object models. Generally, an MLP model is a feedforward artificial neural network having at least three layers of nodes. The layers include an input layer, a hidden layer, and an output layer. Each layer has multiple nodes. Each node includes an activation function with learnable parameters. Through training and backpropagation of losses, the parameters are updated and correspondingly, the MLP model improves in making predictions.

Although a single shared MLP model (342) is shown, the MLP model may include multiple MLP models. An MLP geometry model maps a point location to signed distance and then to a volume density. The MLP surface model is trained based on sensor data. The signed distance function of the NeRSDF model maps a location in three-dimensional space to the location's signed distance from the object's surface (i.e., object surface). The signed distance is a distance that may be positive, zero, or negative from the target object surface depending on the position of the location with respect to the object surface. In the signed distance, a positive value is outside the first surface of the object that the ray passes through, zero at object surface, negative inside the object, most negative at center of the object, and less negative closer to second surface of the object, zero at second surface of the object that the ray passes through, and then positive outside the second surface that the object passes through. The signed distance may then be mapped by a position function that maps the signed distance to one if the location is inside the object and zero otherwise.

A second MLP may be a feature descriptor MLP. The second MLP may take, as input, the geometry feature vector and viewpoint encoding and predict a neural feature descriptor. The neural feature descriptor includes neural features for the particular point. In one or more embodiments, the second MLP is a single MLP that takes the location and view direction as input and directly outputs neural features descriptors.

A ray casting engine (344) is configured to define and cast rays to a target object from a sensor. For an object, the ray has a first endpoint at the virtual sensor and a second endpoint on an opposing side of the target object or where the ray intersects the target object. The ray may pass through the target object. As such, the ray passes through at least a near point on the surface of the target object and a far point on the surface of the target object. Because the ray is a line, an infinite number of locations are along the ray. One or more embodiments use a sampling technique to sample locations along the ray and determine feature descriptors for each location using the rest of the object model framework (304). In one or more embodiments, the ray casting engine (344) is configured to aggregate the feature descriptors along the locations of the ray. A single ray may pass through multiple objects. Thus, the accumulation may be through the multiple objects.

The interpolator (346) is configured to interpolate features from the object model across different ones of the multiple resolutions and from different locations. Specifically, the interpolator (346) is configured to generate an interpolated set of features for a particular location in the object model from the neural hash grid.

The LiDAR decoder (350) is a neural network that is configured to generate a LiDAR point based on the output of the shared MLP model (342). The LiDAR point has a pair of depth and intensity that is accumulated along a LiDAR ray. The depth value for the LiDAR ray is calculated as the accumulation of the depths. An accumulation depth function may be used to calculate the depth value. The accumulation depth function weighs the depth values according to the position of the location and the accumulated transmittance. A decoder MLP model of the LiDAR decoder (350) takes, as input, the accumulated volume rendered features and outputs the intensity.

The loss function (354) is a function used to calculate the loss for the system. The loss function (354) uses the various outputs of the object model framework (304) to calculate a loss that is used to update, through backpropagation, the object model framework (304).

The location of dynamic objects and the location of the camera may be defined by the augmented scene generator (360). For example, the augmented scene generator may be a part of the training data generator (122) in FIG. 1.

Figure 4:
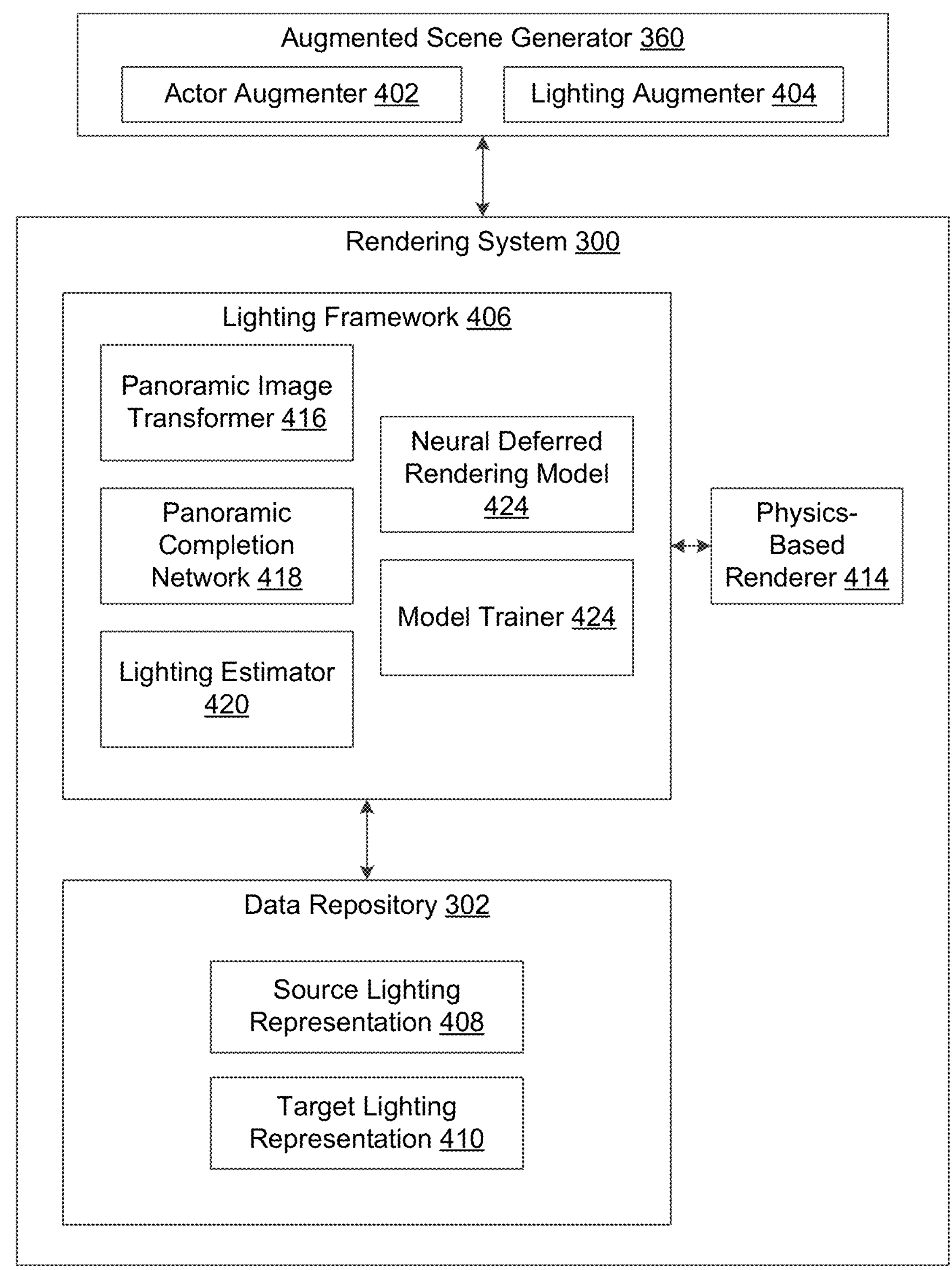
FIG. 4 shows a second diagram of the rendering system in accordance with one or more embodiments.

Turning to FIG. 4, FIG. 4 shows a second portion of the rendering system (300) in accordance with one or more embodiments. Specifically, FIG. 3 shows a portion of the rendering system (300) to generate the neural hash grid and generate LiDAR output and FIG. 4 shows a portion of the rendering system (300) to generate an augmented image. The rendering system (300) is configured to take, as input, the output of the augmented scene generator (360). The augmented scene generator (360) includes functionality to specify criteria for changing a real-world scenario. For example, the augmented scene generator (360) may include an actor augmenter (402) and a lighting augmenter (404). The actor augmenter (402) may specify changes to the actors in the scene. The changes may include changes in the attributes of the actors (e.g., car color, size, type) or changes in the position. The changes in position may be specified as the change in trajectory. The changes may also include the addition, removal of one or more actors. The lighting augmenter (404) may specify a change in the lighting of the real-world scene to generate the augmented scene. For example, the lighting may be a position and intensity of one or more light sources.

In addition to the object model framework in FIG. 3, the rendering system (300) includes a lighting framework (406). The lighting framework (406) is connected to the data repository (302) described above with reference to FIG. 3. To reduce redundancy, the portions of the data repository (302) shown in FIG. 3 are not repeated in FIG. 4. The lighting framework (406) may use various components of the data repository shown in FIG. 3.

As shown in FIG. 4, the data repository (302) includes a source lighting representation (408) and a target lighting representation (410). In general, a lighting representation is a data defining the location of one or more light sources within the real-world or within the virtual world. For example, the location may be the elevation, the azimuth, and the intensity of the light source. The elevation is the vertical elevation of the light source from the horizon. The azimuth is the direction of the light source in a 360-degree representation. The intensity is the amount of light provided by the light source. Further, in one or more embodiments, the lighting representation may include the intensity of light at various locations due to the light source. The intensity is the amount of light due to the light source that surrounds the light source or is in the sky.

Various lighting representations may be used. In some embodiments, the source lighting representation (408) and the target lighting representations (410) are sky domes. A sky dome is a spherical representation of the sky. In the sky dome, the perspective of the camera is within the sphere. Stated another way, the dome is a half of a sphere representing the sky and the virtual camera is located within the dome. If a panoramic image perspective is used, the panoramic image may be a 360-degree view of the area surrounding the camera, whereby the two ends connect, and the sky dome extends vertically upward from a horizon. Foreground objects (e.g., nearby cars and buildings) and background objects (e.g., distant objects such as distant building) may obfuscate a portion of the sky dome.

The source lighting representation (408) is a representation of the real-world source lighting. Specifically, the source lighting representation is the lighting representation of the detected source lighting in the real-world images. The target lighting representation (410) is the lighting representation for the augmented image. For example, the target lighting representation may modify at least one of the elevation, the azimuth, and the intensity of the light source from the source lighting representation. In some cases, the target lighting representation may modify the diffusion of the light from the light source, such as in the case of mimicking fog. As another example, the target lighting representation may be a lighting representation from another real-world scene. Multiple separate modifications may be made to the same source lighting representation to generate multiple target lighting representations corresponding to individual scenarios.

The lighting framework (406) includes functionality to generate an augmented image from a set of real-world images. The lighting framework (406) is connected to a physics-based renderer (414). An example of the physics-based renderer (414) is the ray casting engine (344) of FIG. 3. Specifically, the physics-based renderer (414) generates augmented image buffers having one or more features of the augmented image. The augmented image is an image of a virtual camera that is a modification of the real-world image from a real-world camera. The virtual camera has a specified perspective, location, and intrinsics (e.g., defined resolution, zoom, etc.) to simulate a real-world camera. The modification for the augmented image from the real-world image may include one or more of a modification of the real-world scene, lighting of the real-world scene, and perspective of the camera in the real-world scene. The physics-based renderer (414) using equations to generate the augmented image buffers from a model of the augmented scene.

Continuing with FIG. 4, the lighting framework (406) includes a panoramic image transformer (416), a panoramic completion network (418), a lighting estimator (420), a neural deferred rendering model (422), and a model trainer (424). Each of these components is described below.

The panoramic image transformer (416) includes functionality to generate a panoramic image from a set of real-world images. Each real-world image in the set is concurrently captured by a different physical camera. The real-world image captures only a portion of the real-world scene as defined by the camera direction and the camera's angle of view. The panoramic image transformer (416) is configured to transform the set of real-world images into a panoramic image. In one or more embodiments, the panoramic image is a 360-degree view of the real-world scene. The 360-degree view may omit portions of the ground and, optionally, portions of the sky. The panoramic image transformer (416) is configured to perform a mathematical based mapping whereby pixels in the real-world image are mapped to corresponding pixels in the real-world panoramic image and a used for the value of the pixel in the panoramic image. If pixels from two different real-world images are mapped to the same pixel in the panoramic image, the panoramic image transformer (416) is further configured to obtain a value for the pixel in the panoramic image from the overlapping pixels.

The panoramic completion network (418) is a machine learning model that is configured to complete the panoramic image from a partial panoramic image. A partial panoramic image is a panoramic image that does not have values for some of the pixels in the partial panoramic image. For example, the set of real-world images may not have an angle of view that covers an entire real-world scene including a sky. The panoramic completion network is configured to generate a low dynamic range image that completes the panoramic image. The low-dynamic range image may still omit portions of the ground and portions of the sky without departing from the scope of the invention. For example, in the low-dynamic range image, intensity may be measured with eight bits. The remaining panoramic image may be the same as generated by the panoramic image transformer (416). In one or more embodiments, the panoramic completion network (418) is an inpainting network. The inpainting network may have multiple neural network layers that add values for the missing values of the partial panoramic image.

The lighting estimator (420) is a configured to generate the source lighting representation (408). In one or more embodiments, the lighting estimator may include an encoder decoder architecture. Separate encoders may be used for peak direction and intensity of the light source (e.g., such as the sun) as well as for a latent representation of the lighting due to the light source. In one or more embodiments, the lighting estimator (420) may further use information from a geographical positioning system (GPS), time, and weather to perform the lighting estimation.

The neural deferred rendering model (424) is a machine learning model that is configured to take as input the augmented image buffers defining the augmented image, the source lighting representation, the target lighting representation, and generate, as output, an augmented image. The augmented image is an image defined by the augmented image buffers, but with the target lighting defined by the target lighting representation. Stated another way, the neural deferred rendering model performs the lighting of the image. Shadows and intensity of different pixels of the augmented image match the shadows and intensity as defined by the target lighting representation.

The model trainer (424) is configured to train the panoramic completion network (418), the lighting estimator (420), and the neural deferred rendering model (424). For example, the model trainer (424) may be configured to generate training data for the various models (e.g., panoramic completion network (418), the lighting estimator (420), and the neural deferred rendering model (424)) from real-world images. The model trainer (424) is further configured to initiate the execution of the various models to obtain predicted results and perform a comparison of the predicted results with the actual results. Further, the model trainer (424) is configured to generate loss based on the comparison and update the respective model. The operations to perform the training by the model trainer is described after the discussion of FIG. 6.

FIGS. 5 and 6 show flowcharts in accordance with one or more embodiments. FIG. 5 shows a flowchart for training the object model system and FIG. 6 shows a flowchart for using the lighting system with the trained object model system. While the various steps in these flowcharts are presented and described sequentially, at least some of the steps may be executed in different orders, may be combined or omitted, and at least some of the steps may be executed in parallel. Furthermore, the steps may be performed actively or passively.

A scene (e.g., real-world scene, augmented scene) is divided into components including a static scene, a distant region (e.g., sky and far buildings), and dynamic actors. The actors are the objects described above. The components of the scene are modeled using the same architecture but with different feature grid size. For each dynamic actor, its feature grid F is generated by the hypernetwork (HyperNet) from the latent code z. First, for each sampled point along the ray r with location x and view direction d, the feature descriptor f is queried from the neural hash grid. Then, volume rendering is performed to get the rendered feature descriptor f. During training, a convolutional neural network (CNN) decoder may be used to decode the feature descriptor patch to an red-green-blue (RGB image, and a LiDAR intensity MLP decoder may be used to predict the LiDAR intensity lint for ray r. The various portions correspond to like named components in FIG. 3.

After the neural hash grids are constructed, one or more embodiments retrieve the features for each sampled point via tri-linear interpolation. A geometry MLP may generate a geometry feature, which is then concatenated with embedded view direction, pass to another MLP to get the final rendering. The appearance MLP may be non-linear.

The following is a description of scene representation. One or more embodiments first define the region of interest using the trajectory of the autonomous system. One or more embodiments then generate an occupancy grid for the volume and set the voxel size. For the static scene model, the multi-resolution feature grids may have sixteen levels in the resolution hierarchy. The resolution may increase exponentially. For the dynamic actor model, the multi-resolution feature grids may have several levels and the resolution increases exponentially. A spatial hash function may be used to map each feature grid to a fixed number of features.

The following is a description of the dynamic actor model (i.e., the neural hash grid in FIG. 3). Each actor model is represented by an independent features grid generated from a shared HyperNet. The HyperNet fz may be a multi-layer MLP. The dynamic actor tracklets that are provided might be inaccurate, even when human-annotated, and lead to blurry results. Thus, the actor tracklets may be refined during training. For each dynamic actor $A_i$ with trajectory initialized by a sequence of poses, one or more embodiments jointly optimize the rotation and translation components of the poses at each timestep. A symmetry prior along the longitudinal axis may be incorporated for vehicle objects. During training, one or more embodiments randomly flip the input point and view direction when querying the neural feature fields.

For distant regions outside the volume, one or more embodiments modeled the distant regions using an inverted sphere parameterization. One or more embodiments sample sixteen points for the distant sky region during volume rendering.

To obtain the geometry s and feature descriptor f from the features grid for both the static scene ($f_{bg}$) and actors ($f_A$), both $f_{bg}$ and $f_A$ include multiple sub-networks. A first sub-network may be an MLP that takes the interpolated feature and predicts the geometry s (signed distance value) and intermediate geometry feature. The second sub-network may be an MLP that takes the intermediate geometry feature and viewpoint encoding as input and predicts the neural feature descriptor f.

In Block 502, for multiple objects including stationary and moving objects, the neural hash grids are initialized. Further, the constraint vectors may be initially set to zero. To initialize the neural hash grid, the hypernetwork takes the constraint vector for each moving object and directly predicts the neural hash grid within the volume of the object's bounding box. The background scene (e.g., the target region and the external region) does not have a hypernetwork, and one or more embodiments directly learn the target region background model and the external region background model.

In Block 504, a location is selected. For a particular virtual sensor, a set of rays is defined based on the sensor's intrinsics and extrinsics. Because the virtual sensor may replicate a real-world sensor on a real autonomous system, the virtual sensor's intrinsics and extrinsics may be defined by a corresponding real-world sensor. The ray casting engine casts rays into the scene (e.g., defined by the simulation system). During training, the scene is set as a scene in the real world. Thus, real-world camera and LiDAR images may match the virtual scene that is being rendered. For each ray, points along the ray are sampled. Each sampled point corresponds to a location that may be selected in Block 504.

In Block 506, hash grid features adjacent to the sampled point in the corresponding neural hash grid of an object are interpolated to obtain a set of location features. Trilinear interpolation may be performed. Specifically, for a particular location, the object at the location is identified and the neural hash grid for the object is obtained. The cubes of the neural hash grid in which the location is located at each resolution are determined. Interpolation is applied to the cubes to calculate the specific location features at that specific location in continuous space.

In Block 508, the MLP model is executed on the set of location features to obtain a set of image features for the location. In one or more embodiments, the MLP model is a shared MLP model that generates neural features (i.e., image features) from the set of location features. The locations features are processed as a feature vector through the layers of the MLP model to generate the neural features. The neural feature may be further processed through volume rendering to generate the image feature map. One or more embodiments volume render an image feature map. The feature map is processed by the CNN decoder to generate the final image. The image features in the feature map are different from the hash grid features. The image feature is generated by the shared MLP that takes the hash grid feature and view direction as input. Equation (1) below characterizes the generation of the image features in one or more embodiments.

In Block 510, a determination is made whether another location exists. If another location exists, the flow returns to Block 504 to select the next location. For example, the next ray or the next sample along the ray may be determined.

In Block 512, ray casting is performed to generate a feature image from the image features. The ray casting engine combines the features from the feature map along the ray to generate accumulated features for the ray. The process is repeated for each ray by the ray casting engine.

In Block 516, a LiDAR decoder is executed on the output of the MLP model. In one or more embodiments, because LiDAR sensors may be located at different locations than the cameras on an autonomous system, although the same models may be used for LiDAR and camera, different outputs of the MLP model may be used for the LiDAR and camera. A LiDAR point has a distance value and an intensity value. The distance value may be calculated directly from the sample points along the ray. The LiDAR decoder model may predict the intensity value from the outputs of the sample points along the ray.

In Block 518, a loss is calculated using the labeled sensor data. In one or more embodiments a single loss value is calculated as a combination of losses. The single loss is backpropagated through the models of the network. Loss is determined using observed values acquired from the real world. For example, a sensing vehicle driving down a street may have cameras and LiDAR sensors to capture various observations of the target object. The loss includes RGB pixel loss LiDAR loss, a regularization loss, and adversarial loss.

RGB loss is a camera image loss accumulated across patches using color values in the rendered image and sensor data for the same viewing direction and angle. For each of at least a subset of pixels, the observed color value for the corresponding pixel in the target image is determined. Specifically, the difference between the observed color value and the simulated color value is calculated. The averages of the differences are the camera image loss.

The cameral image loss may also a perceptual loss. A perceptual loss may use a pretrained network that computes a feature map from an image. The difference between the feature map generated by the pretrained network on the actual image and the feature map generated by the pretrained network on the rendered image is the perceptual loss.

The LiDAR loss is a loss accumulated across a subset of LiDAR rays and may be calculated using LiDAR points determined for the LiDAR rays and sensor data for the same viewing direction and angle as the LiDAR ray. For each LiDAR ray, the observed LiDAR point for the target object at the same viewing direction and angle as the LiDAR ray is obtained. The observed LiDAR point is compared to the simulated LiDAR depth. Specifically, the difference between the depths in the observed LiDAR point value and the simulated depth in the simulated LiDAR point value is calculated as the depth difference. Similarly, the difference between the intensities in the observed LiDAR point value and the simulated intensity in the simulated LiDAR point value is calculated as the intensity difference. The depth difference and intensity difference are combined, such as through weighted summation to generate a total difference for the LiDAR point. Averages of the total differences across the LiDAR points is the LiDAR loss.

In at least some embodiments, a regularization term is calculated and used as part of the total loss. The regularization term may include a term to encourage the signed distance function to satisfy the Eikonal equation and a smoothness term to encourage the reconstructed target object to be smooth.

The total loss may be calculated as a weighted summation of the losses. Each loss is weighted by a parameter for weighing the loss. The parameters are configurable.

The total loss is backpropagated through the models of the object model system. During different time periods of the training, different models may be frozen to calculate the total loss. Specifically, the total loss is backpropagated through the MLP, LiDAR, and hypernetwork. The process may repetitively train the object model framework to iteratively improve the object model system.

The result of the processing of FIG. 5 is a set of trained neural hash grids for a real-world scene.

FIG. 6 shows a flowchart for using a real-world scene to generate an augmented image that has a target lighting defined for the augmented image. In Block 602, set of real-world images of a real-world scene is obtained. Real-world images captured for a static scene or concurrently captured for a dynamic scene are obtained. Concurrently captured means that the scene does not substantively change between the different captures. For example, the real-world images may be considered concurrently captured when the real-world images are captured within a few milliseconds or a second of each other. As sensing system, such as a vehicle equipped with various sensors, moves through a region, cameras on the sensing system capture real-world images. The images captured from different cameras concurrently form a set of real-world images for a point in time.

In Block 604, a panoramic image from the real-world image is generated. The processing of Block 604 is performed for the set of real-world images. Each real-world image includes multiple image pixels (i.e., the images of the pixels). The image pixels are mapped to corresponding panoramic pixels in the panoramic images. The mapping may be performed based on distance between the camera and the object in the real-world captured by the image pixel. Specifically, for each image pixel the real-world image, the image pixel is mapped to a location of the object in the real-world scene. The object is the object shown by the image pixel (and possibly surrounding pixels).

In one or more embodiments, a virtual model of the real-world is generated, such as described above, with reference to FIG. 3. The location of the real-world camera in the real world may be used to define the location of the virtual world camera in the virtual world. The image pixel is mapped to a ray from the virtual camera based on the location of the image pixel in the real-world image. The point at which the ray intercepts an object representation of the object is used as the location of the object in the real-world scene that is shown by the image pixel. The distance along the ray from the virtual camera to the location of the object representation is used as the distance for the image pixel.

In some embodiments, rather than using a virtual world representation of a real-world scene, the mapping may be performed using a mathematical combination. Each image pixel may have a corresponding transposition that defines the mapping of the image pixel to the corresponding panoramic pixel. Thus, the mathematical processing may be performed to determine the panoramic pixel.

The image pixel may then be transformed to a corresponding panoramic pixel at the corresponding position in the panoramic image. A virtual panoramic camera may be defined in virtual world that has a 360-degree view. The virtual panoramic camera captures locations in the virtual world, such as via ray-casting, to have panoramic pixels. If the location is mapped to an image pixel, then the value of the image pixel is used as the value of the panoramic pixel. Specifically, the color values of one or more image pixels that are mapped to the panoramic pixels are used to generate the value of the panoramic pixel. For example, if a single image pixel is mapped, then the value of the single image pixel is used as the value of the panoramic pixel.

In some cases, the real-world images overlap. For example, the real-world images may have overlapping portions of the real-world. In such an example, multiple image pixels of real-world images are detected as mapping to the same corresponding pixel in the panoramic image. Each of the multiple image pixels have a corresponding color value. From the corresponding color value, a combined color value is generated. The combined color value may be performed using averaging of the color values, voting, or other combination. Thus, transforming the image pixel for the images pixels includes using the combined color value for the corresponding panoramic pixel.

As discussed above, the processing described above may generating a partial panoramic image from the set of real-world images. For example, the set of real-world images may not span the angle of view of the panoramic image. In such a scenario, a panoramic completion network completes the partial panoramic image to generate a low dynamic range image. The panoramic image is then generated from the low dynamic range image.

In Block 606, a source light representation of the real-world scene is generated from the panoramic image of the real-world scene. A lighting estimator processes the panoramic image to generate a source lighting representation of the real-world scene. The lighting estimator processes the panoramic image through an encoder decoder network that is trained to generate the source lighting representation. For example, the lighting estimator may estimate a sky dome from the panoramic image, whereby the source lighting representation is the sky dome. In one or more embodiments, the lighting estimator identifies the location of a peak amplitude in the lighting representation. The lighting estimator then determines an azimuth, an elevation, and an intensity of a sky dome light source from the location of the peak amplitude.

In Block 608, a target lighting representation that identifies at least one target light source is selected. Selecting a target lighting representation may be performed by the simulation system. For example, the simulation system may modify a location of the light source, or the intensity of the light source, based on the source lighting representation. The simulation system may the location (e.g., by modifying at least one of the azimuth or the elevation of the light source) or the simulation system may modify the intensity. The result is a target light source having a different location or intensity. The simulation system may then generate the target lighting representation based on the target light source. For example, by regressing the light source intensity from the location across the target lighting representation, the target lighting representation is generated.

In Block 610, the real-world scene is augmented to generate an augmented scene. The augmented scene of objects and the autonomous system is defined. For example, generating the augmented scene may include moving an actor in the augmented scene from the real-world scene, adding an actor to the augmented scene as compared to the real-world scene, and removing an actor from the augmented scene as compared to the real-world scene. The simulation system may define a scenario to test the autonomous system. As another example, a predefined scenario may exist. Defining the augmented scene specifies the location of the three-dimensional virtual objects and the autonomous system, or more generally, the player, in the virtual environment. Various mechanisms may be used to define the augmented scene. In one or more embodiments, as the augmented scene is defined, the corresponding object models for the objects are added, moved, or removed from virtual locations to generate the augmented scenario.

In Block 612, the augmented scene is processed to generate augmented image buffers. In one or more embodiments, the target lighting representation may also be used to generate at least one augmented image buffer. In one or more embodiments, the processing of the augmented scene is performed by a physics-based rendering model. The physics-based rendering model takes a model of augmented scene as input and produces one or more augmented images as output. The physics-based rendering model may perform ray-casting from a virtual camera location to objects in the scene to render the image. For neural hash grid described in FIGS. 3 and 5, the augmented image buffers are features determined from the neural hash grid. Specifically, at sample points along the ray, a signed distance function may be calculated to determine whether a corresponding object is intercepted at the sample point. If the signed distance indicates the interception, the hash grid features adjacent to the sampled point in the corresponding neural hash grid of an object are interpolated to obtain a set of location features which are combined for the different set of sampled points along the ray. The process is repeated for the sample points along the ray. A multi-layer perceptron model may be executed on the set of location features to obtain a set of image features for the location corresponding to the ray. The processing is then repeated. The set of image features are stored in one or more augmented image buffers.

In Block 614, a neural deferred rendering model processes the augmented image buffers, the source lighting representation, and a target lighting representation to generate an augmented image having shadows according to the target light source. As discussed above, the neural deferred rendering model is a machine learning model that learns how changes in the real-world scene to the augmented scene as well as changes in the lighting representation from the real-world lighting representation to the target lighting representation adjusts the color values of pixels in the resulting image. The result is a set of shadows in the augmented image that match the target light source as well as the changes of actors, and optionally, objects, in the virtual world.

In Block 616, the augmented image is outputted. The augmented image may be processed. For example, the augmented image may be in a set of augmented image that are defined to train a virtual driver of an autonomous system. As another example, the augmented image may be transmitted to a player playing in an augmented reality version of the virtual world. Processing the rendered image may include transmitting the rendered image to a different machine for display, displaying the rendered image, processing the rendered image by a virtual driver (e.g., to determine an action or reaction based on the rendered image), storing the rendered image, or performing other processing. Because a trained rendering system is used, the augmented image is a realistic representation of the simulated environment, but with objects in different positions than the real world and having real-world based lighting effects.

The following is a discussion of training of the lighting framework. To train the panoramic completion network, an input set of training panoramic images are cropped to match a view of the panoramic image to generate cropped images. The input set of training panoramic images may be actual panoramic images that are provided to the system. The cropping is performed to keep the panoramic pixels that would be mapped to at least one image pixel and remove panoramic pixels that would not be mapped to at least one image pixel. Downscaling may also be performed to match the resolution of the real-world cameras that are used to generate the real-world images. Thus, a training pair is created that includes the cropped panoramic image, simulating the input to the panoramic completion network, and the goal output that should be the output of the panoramic image.

The panoramic completion network completes the cropped images to obtain a predicted images. The predicted images are the low-dynamic range images output by the panoramic completion network. A loss is generated based on a comparison of the training panoramic images with the predicted images. The loss is comparison of the color values between the respective panoramic pixels in the training panoramic image as compared to the corresponding predicted image. From an accumulation of the loss, the panoramic completion network is updated.

A similar technique may be used to update the lighting estimator. For example, high-dynamic range training panoramic images may be tone-mapped to generate low-dynamic range training panoramic images. For example, the higher byte representation of panoramic pixels the training panoramic image are each transformed into a lower byte representation to generate a panoramic pixel for a low dynamic range training panoramic image. The low dynamic range training panoramic images are processed by the lighting estimator to generate predicted sky domes. A loss is generated based on a comparison of the high dynamic range training panoramic images to the predicted sky domes. For example, the loss may be how well the lighting estimator predicts the lighting. The lighting estimator is updated according to the loss.

Figure 7A:
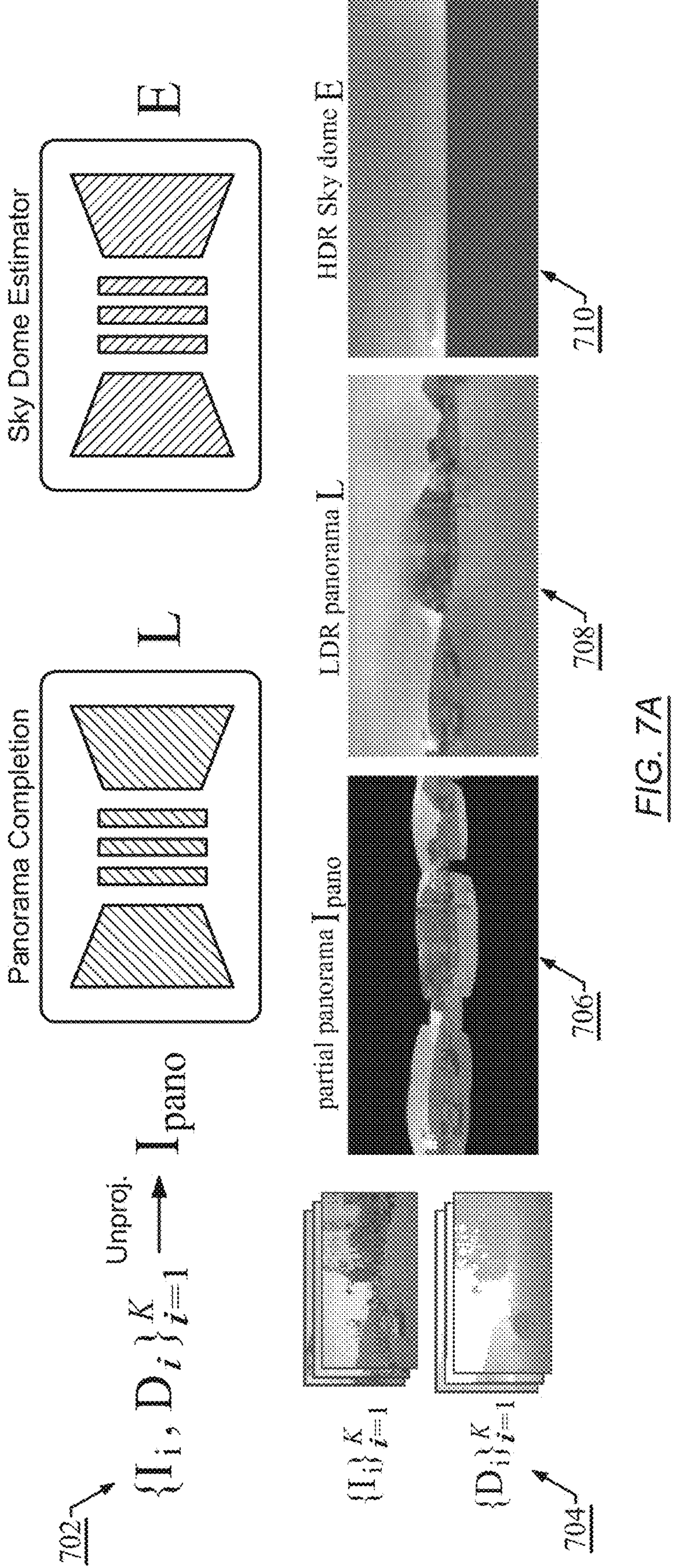
FIG. 7A, FIG. 7B, FIG. 7C, and FIG. 7D show example architecture diagrams of the rendering system in accordance with one or more embodiments.

FIG. 7A, FIG. 7B, FIG. 7C, and FIG. 7D show an example of an overall process in accordance with one or more embodiments. Turning to FIG. 7A, FIG. 7A shows a diagram for generating a source lighting estimation from a set of real-world images.

A goal is to create a diverse, controllable, and realistic simulator that can generate camera data of scenes at scale under diverse lighting conditions. Towards this goal, one or more embodiments first reconstruct lighting-aware digital twins from camera and LiDAR data collected by a moving platform. The digital twin includes the geometry and appearance of the static background and dynamic actors obtained through neural rendering, as well as the estimated scene lighting. The representation is built to allow full controllability of the scene, including modifying actor placement or player position, adding and removing actors in a lighting-aware manner for more accurate shadows and occlusion, and modifying lighting conditions, such as changing the sun's location or intensity.

For neural scene reconstruction, the scene geometry and base texture may be learned via neural fields. The neural field $F:x \mapsto (s,k_d)$ to map a three-dimensional (3D) location x to a signed distance $s \in \mathbb{R}$ and view-independent diffuse color $k_d \in \mathbb{R}^3$. One or more embodiments decompose the driving scene into a static background B and a set of dynamic actors $$\{A_i\}_{i=1}^{M}$$

and map multi-resolution spatial feature grids using MLP networks (e.g., an MLP network for the static scene and an MLP network for the dynamic actors. The compositional representation allows for 3D-aware actor insertion, removal, or manipulation within the background. From using a learned neural field (e.g., the neural hash grid), one or more embodiments may use marching cubes and quadric mesh decimation to extract simplified textured meshes M for the scene. Given the desired lighting conditions, one or more embodiments can render our reconstructed scene in a physically based renderer to model object-light interactions.

Turning to FIG. 7A, by way of an overview, FIG. 7A shows a technique for generating a high-dynamic range (HDR) sky dome. In addition to extracting geometry and appearance, one or more embodiments estimate the scene lighting using a high-dynamic-range (HDR) panoramic sky dome E to represent the light from the sun and the sky. The representation models the major light sources of outdoor daytime scenes and is compatible with rendering engines. Generally, estimating the HDR sky dome from sensor data is challenging, as most cameras on SDVs have limited field-of-view (FoV) and do not capture the full sky. Additionally, camera data are typically stored with low dynamic range (LDR) in self-driving datasets. Namely, the intensities are represented with 8-bits. To overcome the challenges, one or more embodiments first leverage multi-camera data and extracted geometry to estimate an incomplete panorama LDR image that captures scene context and available sky observations. An inpainting network is applied to fill in missing sky regions. Then, one or more embodiments utilize a sky dome estimator network that lifts the LDR panorama image to an HDR sky dome and the HDR sky dome with GPS data to obtain accurate sun direction and intensity. One or more embodiments leverage multi-sensor data for more accurate estimation.

By way of a more specific description of FIG. 7A, given K images $$I = \{I_i\}_{i=1}^{K}$$

(702) captured by multiple cameras triggered close in time and the camera's corresponding camera poses $$P = \{P_i\}_{i=1}^{K},$$

the lighting framework first renders the corresponding depth maps $$D = \{D_i\}_{i=1}^{K}$$

(704) from extracted geometry $\mathcal{M}$: $D_i = \psi(\mathcal{M}, P_i)$, where $\psi$ is the depth rendering function and $P_i \in \mathbb{R}^{3\times4}$ is the camera projection matrix (a composition of camera intrinsics and extrinsics). The lighting framework may set the depth values for the sky region to infinity. For each image pixel (u', v'), the panoramic image transformer may use the rendered depth and projection matrix to estimate 3D world coordinates, then apply an equirectangular projection E to determine the image pixel's intensity contribution to panorama pixel (u, v), resulting in $I_{pano}$ (706):

$$I_{pano} = \Theta(I, D, P) = E(\pi^{-1}(I, D, P)), \tag{1}$$

where $\Theta$ is the pixel-wise transformation that maps the red-green-blue (RGB) of limited field-of-view (FoV) images I at coordinate (u', v') to the (u, v) pixel of the panorama. For areas with overlap, the panoramic image transformer may average the source image pixels that are projected to the same panorama (u, v). In the self-driving domain, the stitched panorama $I_{pano}$ may cover a 360° horizontal FoV, but the vertical FoV is limited and cannot fully cover the sky region as shown in FIG. 7A. Therefore, a panoramic completion network may complete $I_{pano}$, creating a full-coverage (360°×180°) panorama image (708).

For realistic rendering, an HDR sky dome (710) should have accurate sun placement and intensity, as well as sky appearance. The lighting estimator may be a learned encoder-decoder sky dome estimator network that lifts the incomplete LDR panorama (708) to HDR (710), while also leveraging GPS and time of day for more accurate sun direction. The encoder of the lighting estimator first maps the LDR panorama image to a low-dimensional representation to capture the key attributes of the sky dome, including a sky appearance latent $z_{sky} \in \mathbb{R}^d$, peak sun intensity $f_{int}$, and sun direction $f_{dir}$. By explicitly encoding sun intensity and direction, one or more embodiments enable more human-interpretable control of the lighting conditions and more accurate lighting estimation. The decoder network processes this representation and outputs the HDR sky dome E as follows:

$$E = HDRdecoder(z_{sky}, [f_{int}, f_{dir}]), \tag{2}$$

where $$z_{sky}, f_{int}, f_{dir} = LDRencoder(L).$$

When GPS and time of day are available, one or more embodiments may replace the encoder-estimated direction with the GPS-derived sun direction for more precise sun placement.

The training of the models in FIG. 7A may be performed as follows.

In one or more embodiments, the feature grids and MLP headers $\{f_s, f_{k_d}\}$ may be jointly optimized to reconstruct the observed sensor data via volume rendering. The joint optimization includes calculating a photometric loss on the rendered image, a depth loss on the rendered LiDAR point cloud, and a regularizer, as follows: $\mathcal{L}_{scene} = \mathcal{L}_{rgb} + \lambda_{lidar}\mathcal{L}_{lidar} + \lambda_{reg}\mathcal{L}_{reg}$. Specifically, one or more embodiments may calculate the losses as:

$$\mathcal{L}_{rgb} = \frac{1}{|\mathcal{R}_{img}|}\sum_{r\in\mathcal{R}_{img}} \|C(r) - \hat{C}(r)\|_2, \qquad \mathcal{L}_{lidar} = \frac{1}{|\mathcal{R}_{lidar}|}\sum_{r\in\mathcal{R}_{lidar}} \|D(r) - \hat{D}(r)\|_2. \tag{3}$$

Here, $\mathcal{R}$ represents the set of camera or LiDAR rays. C(r) is the observed color for ray r, and $\hat{C}(r)$ is the predicted color. D(r) is the observed depth for ray r, and $\hat{D}(r)$ is the predicted depth in the range view. To encourage smooth geometry, one or more embodiments also regularize the signed distance function (SDF) to satisfy the Eikonal equation and have free space away from the LiDAR observations.

To train the panoramic completion network to fill the unobserved regions for stitched panorama $I_{pano}$, a data set having panorama images is used. During training, one or more embodiments first generate a camera visibility mask using a limited-FoV camera intrinsics to generate an incomplete panorama image. The masked panorama is then fed into the panoramic completion network and supervised with the full panorama. A hinge generative adversarial network (GAN) loss as the objective function for the generator and discriminator.

To train the lighting estimator, collected HDR sky images from high dynamic range image (HDRI) images may be used. The HDRs may be randomly distorted (e.g., random exposure scaling, horizontal rotation, and flipping) and then tone-mapped to form low dynamic range, high dynamic range (LDR-HDR) pairs (L, E) pairs. $L_1$ angular loss, $L_1$ peak intensity, and $L_2$ HDR reconstruction loss in the log space may be used during training.

Figure 7B:
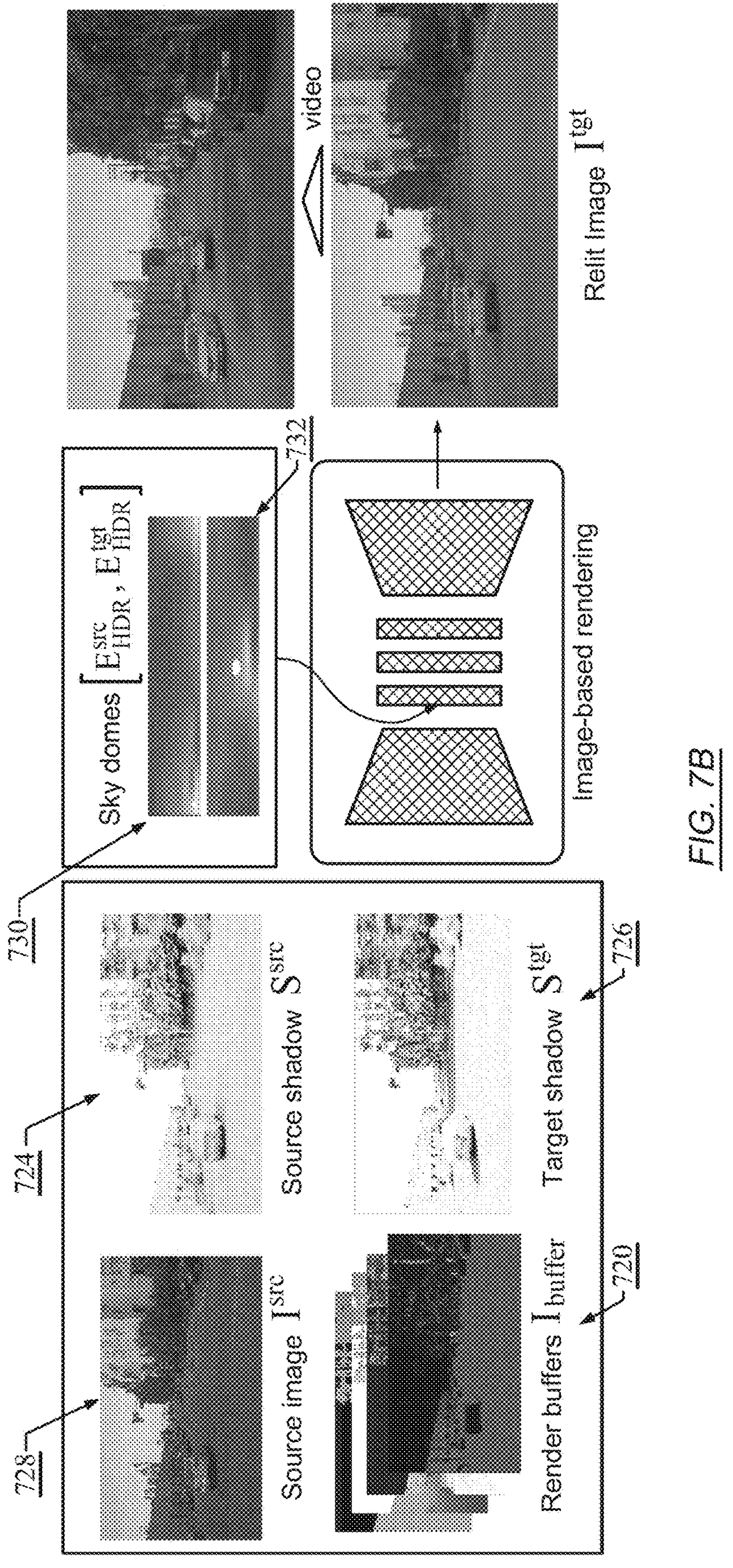

FIG. 7B shows a diagram for generating deferred neural lighting simulation using the source lighting representation of FIG. 7A. The output of FIG. 7A is a lighting-aware digital twin that reconstructs the real-world scenario. A goal of FIG. 7B is to create a controllable camera simulation. To be controllable, the augmented scene representation should not only replicate the real-world scene but also handle changes in dynamic actor behavior and allow for insertion of synthetic rare objects, such as construction cones, that are challenging to find in real data alone. This enables diverse creation of unseen scenes. As our representation is compositional, one or more embodiments can add and remove actors, modify the locations and trajectories of existing actors, change the perspective, and perform neural rendering on the modified scene to generate new camera video in a spatially- and temporally-consistent manner. Using estimated lighting, one or more embodiments can also use a physically-based renderer to seamlessly composite synthetic assets, such as computer aided design (CAD) models, into the augmented scene in a 3D- and lighting-aware manner. These scene edits result in an "augmented reality" representation $\mathcal{M}'$, $E^{src}$ and source image $$I'_{src}.$$

Turning to the FIG. 7B, given the augmented reality representation $\{\mathcal{M}', E^{src},$ $$I'_{src}\},$$

one or more embodiments can perform physically-based rendering under a novel lighting condition $E^{tgt}$ to generate a relit rendered video. The rendered augmented images capture scene relighting effects, such as changes in shadows or overall scene illumination. However, due to imperfect geometry and noise in material/lighting decomposition, the rendering results may lack realism (e.g., the rendered augmented images may contain blurriness, unrealistic surface reflections and boundary artifacts). To mitigate this, one or more embodiments propose a photo-realism enhanced neural deferred rendering paradigm. Deferred rendering splits the rendering process into multiple stages (i.e., rendering geometry before lighting, then composing the two). One or more embodiments use an image synthesis network that takes the source image and pre-computed buffers of lighting-relevant data generated by the rendering engine to produce the final relit augmented image. One or more embodiments also provide the network the environment maps for enhanced lighting context and formulate a novel paired-data training scheme by leveraging the digital twins to generate synthetic paired images.

To perform neural deferred rendering, one or more embodiments place the static background and dynamic actor textured meshes $\mathcal{M}$ in a physically-based renderer and pre-compute the rendering buffers $I_{buffer} \in \mathbb{R}^{h \times w \times 8}$ (720), including position, depth, normal and ambient occlusion for each frame of an augmented video stream. Each frame corresponds to an individual augmented image. Additionally, given an environment map E and material maps, the physically-based renderer performs ray-tracing to generate the rendered image $I_{render|E}$. E is omitted in the following description for simplicity. To model shadow removal and insertion, one or more embodiments may also generate a shadow ratio map $S = I_{render}/\tilde{I}_{render}$, where $\tilde{I}_{render}$ is the rendered image without rendering shadow visibility rays, for both the source and target environment light maps $E^{src}$, $E^{tgt}$ Thus, a shadow ration map exists for the source image ($S^{src}$ (724)) and the target image ($S^{tgt}$ (726)).

One or more embodiments then use a 2D U-Net that takes the source image $I^{src}$ (728), render buffers $I_{buffer}$, and shadow ratio maps $\{S^{src}, S^{tgt}\}$ (724, 726), conditioned on the source and target HDR sky domes $\{E^{src}, E^{tgt}\}$ (730, 732). This network outputs the rendered image $I^{tgt}$ under the target lighting conditions as follows:

$$I^{tgt} = RelitNet([I^{src}, I_{buffer}, S^{src}, S^{tgt}], [E^{src}, E^{tgt}]) \tag{4}$$

The rendering process enables editing the scene, perform scene relighting, and generate a sequence of images under target lighting as the scene evolves to produce simulated camera videos. The simulation is spatially and temporally consistent since one or more embodiments is physically-based and grounded by 3D digital twins.

To ensure that our rendering network maintains controllable lighting and is realistic, one or more embodiments train the neural deferred renderer with a combination of synthetic and real-world data. One or more embodiments take advantage of the fact that digital twin reconstructions are derived from real-world data, and that the physically-based renderer can generate paired data of different source and target lightings of the same scene. This enables data pairs for training the network to learn the relighting task with enhanced realism. For the first data pair, one or more embodiments train the network to map $I_{render|E^{src}} \Rightarrow I_{render|E^{tgt}}$, the physically-based rendered images under the source and target lighting. With the second data pair, one or more embodiments improve realism by training the network to map $I_{render|E^{src}} \rightarrow I_{real}$, mapping any relit synthetic scene to the original real-world image given its estimated environment map as the target lighting. During training, one or more embodiments also encourage self-consistency by ensuring that, given an input image with identical source and target lighting, the neural deferred rendering model recovers the original image. The training objective consists of a photometric loss ($\mathcal{L}_{color}$), a perceptual loss ($\mathcal{L}_{lpips}$), and an edge-based content-preserving loss ($\mathcal{L}_{edge}$):

$$\mathcal{L}_{relight} = \frac{1}{N}\sum_{i=1}^{N} \Big( \underbrace{\big\| I_i^{tgt} - \hat{I}_i^{tgt} \big\|_2}_{\mathcal{L}_{color}} + \lambda_{lpips} \underbrace{\sum_{j=1}^{M} \big\| V^j(I_i^{tgt}) - V^j(\hat{I}_i^{tgt}) \big\|_2}_{\mathcal{L}_{lpips}} + \lambda_{edge} \underbrace{\big\| \nabla I_i^{tgt} - \nabla \hat{I}_i^{tgt} \big\|_2}_{\mathcal{L}_{reg}} \Big), \tag{5}$$

where N is the number of training images and $I^{tgt}/\tilde{I}^{tgt}$ are the observed/synthesized label image and predicted image under the target lighting, respectively. $V^j$ denotes the j-th layer of a pre-trained network, and VI may be the image gradient approximated by Sobel-Feldman operator.

Figure 7C:
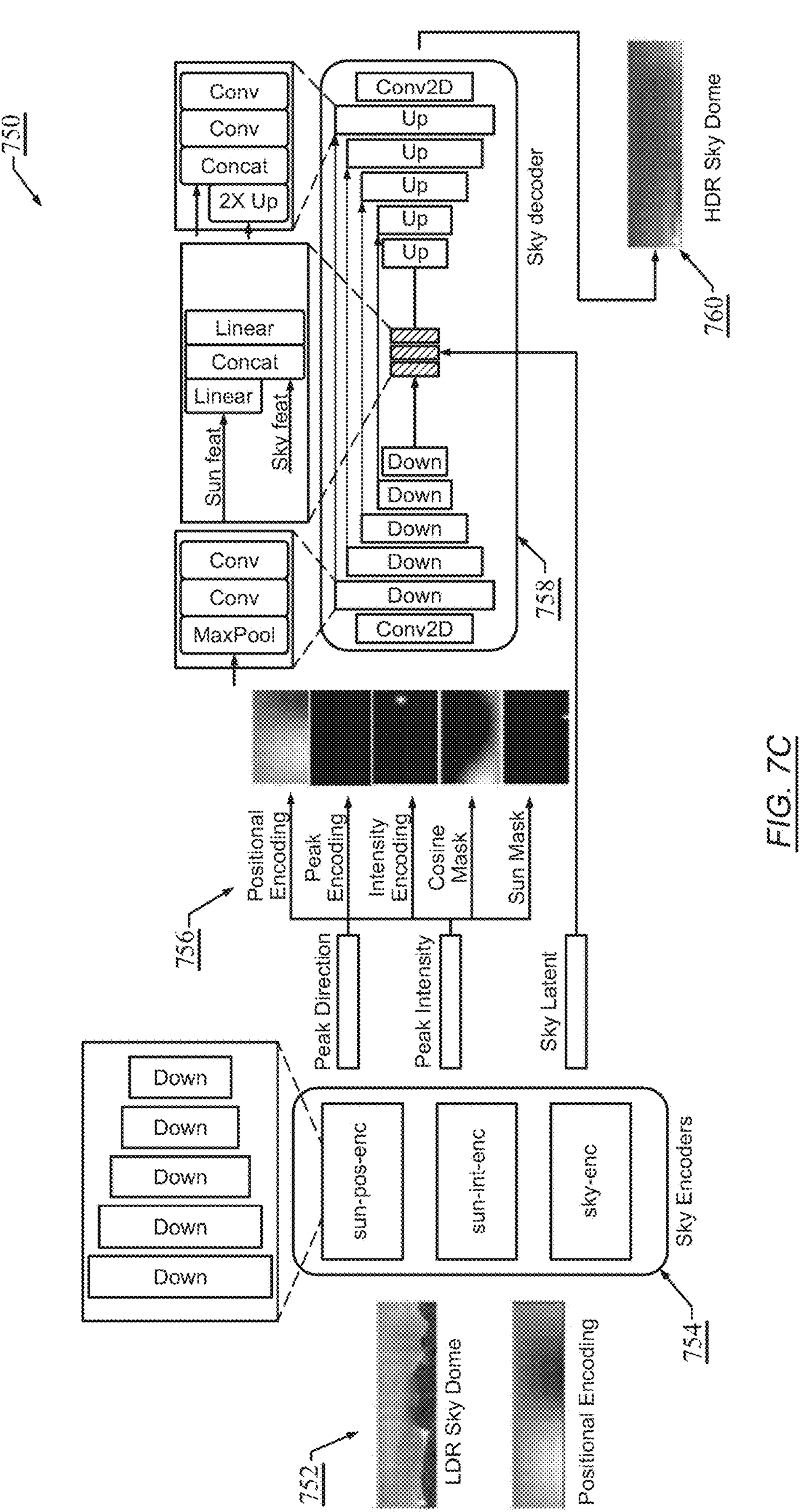

FIG. 7C shows a diagram of the lighting estimation model. One or more embodiments leverage multi-camera data and extracted geometry to estimate an incomplete panorama LDR image that captures scene context and the available observations of the sky. One or more embodiments may apply an inpainting network to fill in missing sky regions. Finally, one or more embodiments leverage a sky dome estimator network that lifts the LDR panorama image to an HDR sky dome and fuses the HDR sky dome with GPS data to obtain accurate sun direction and intensity. Distortions are then applied to the mask, including random scaling and the addition of noise. The masked panorama is then fed into the network and supervised with the unedited Holicity panorama.

After receiving the full LDR output from the inpainting network, the lighting estimator network (750) converts the incomplete LDR panorama to HDR. The sky dome estimator network may employ GPS and time of day to improve the accuracy of sun direction estimation. To produce an LDR sky dome, only the top half of the panorama may be used, as the bottom half does not contribute to global lighting from the sky. The lighting estimation network uses an encoder-decoder architecture, as shown in FIG. 7C. The input consists of the LDR panorama (752) and the positional encoding map, which is an equirectangular projection that stores a unit vector pointing towards each pixel direction. The positional encoding is concatenated channel-wise with the LDR panorama. In one or more embodiments, three separate encoders (754) with the same architecture are utilized to estimate the peak direction $f_{dir}$ and intensity of the sun $f_{int}$, as well as the latent of the sky $z_{sky} \in \mathbb{R}^{64}$. To encode the predicted sun peak intensity $f_{int}$ and peak direction $f_{dir}$, five intermediate representations (756) with the same size as the input LDR are explicitly encoded. The sky decoder (758) is a U-Net which takes the encoded predicted sun peak intensity $f_{int}$ and peak direction $f_{dir}$ and fuses them with the sky latent vector to produce the HDR sky dome (760).

Figure 7D:
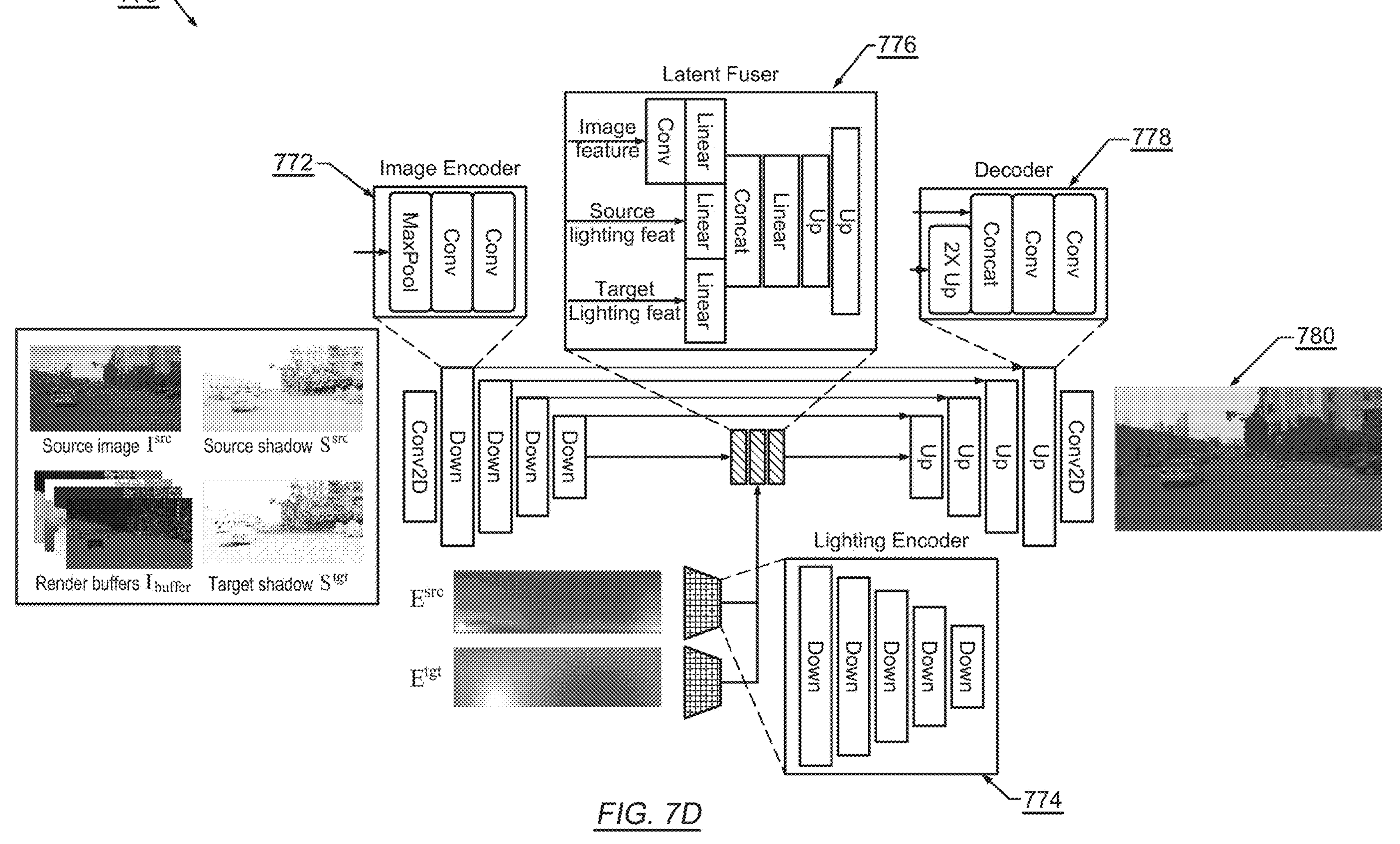

FIG. 7D shows an example architecture of the neural deferred rendering model (770). As shown in FIG. 7D, the neural deferred rendering architecture is an image-to-image network adapted from U-Net that includes an image encoder (772), lighting encoder (774), latent fuser (776), and rendering decoder (778). The inputs to the image encoder may include a source RGB image $I_{src}$, rendering buffers $I_{buffer}$ (ambient occlusion, normal, depth, and position), and source/target shadow ratio maps $\{S_{src}, S_{tgt}\}$. The components may have channels. In the latent fuser (776), the output of the image encoder (772) is run through a convolution layer, then a linear layer that compresses the input into a latent vector. The image latent and two lighting latent vectors (source and target) are concatenated and upsampled. Finally, the rendering decoder upsamples the fused latent vectors and produces the final relit image $\hat{I}^{tgt} \in \mathbb{R}^{H \times W \times 3}$ (780).

Figure 8:
FIG. 8 shows an example simulation scenario as modified from the real world in accordance with one or more embodiments.
Figure 8:
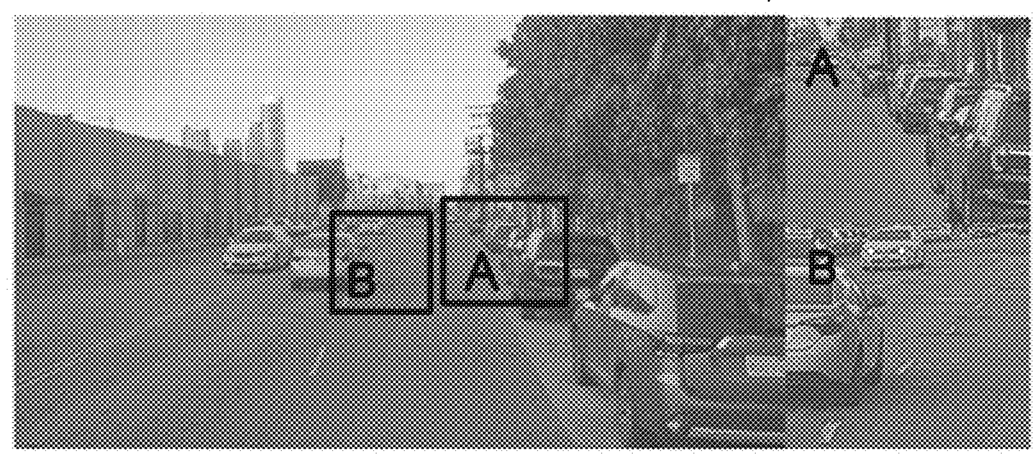
Figure 8:
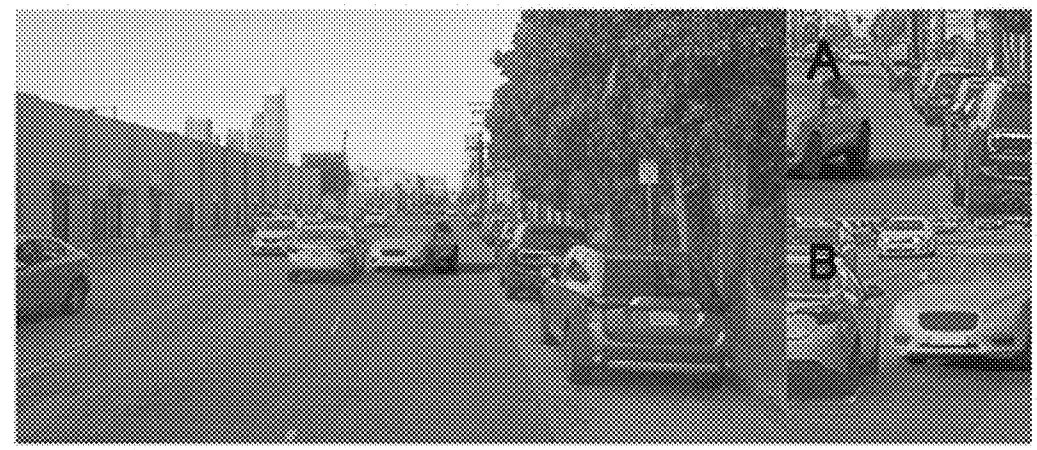
Figure 8:
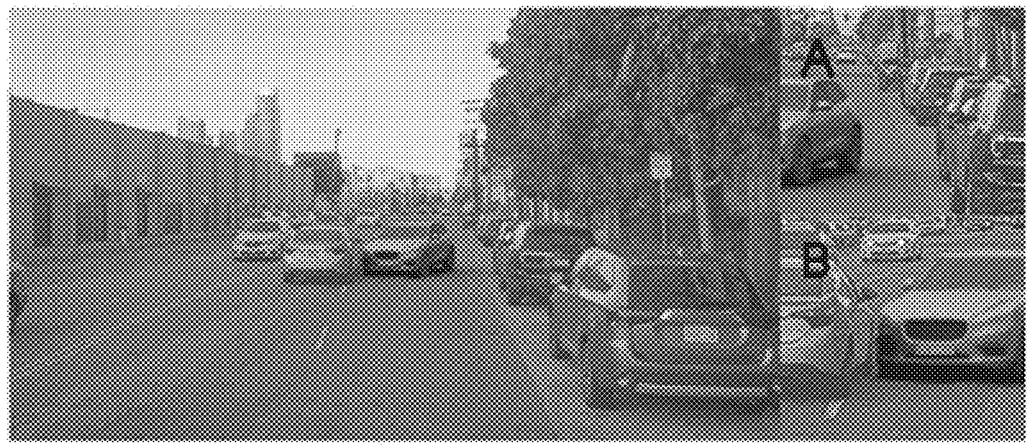

FIG. 8 shows an example of relighting a scene in accordance with one or more embodiments. Original Image (802) shows the real-world image. A car is added as shown in revised image (804), which may be generated without using the techniques described herein. As shown in the shadows of revised image (804) (see section A and section B), the revised image is inaccurate as to the shadows. One or more embodiments generate augmented image (806) that corrects the shadows. Thus, the lighting reflects real world lighting of the overall scene.

Figure 9A:
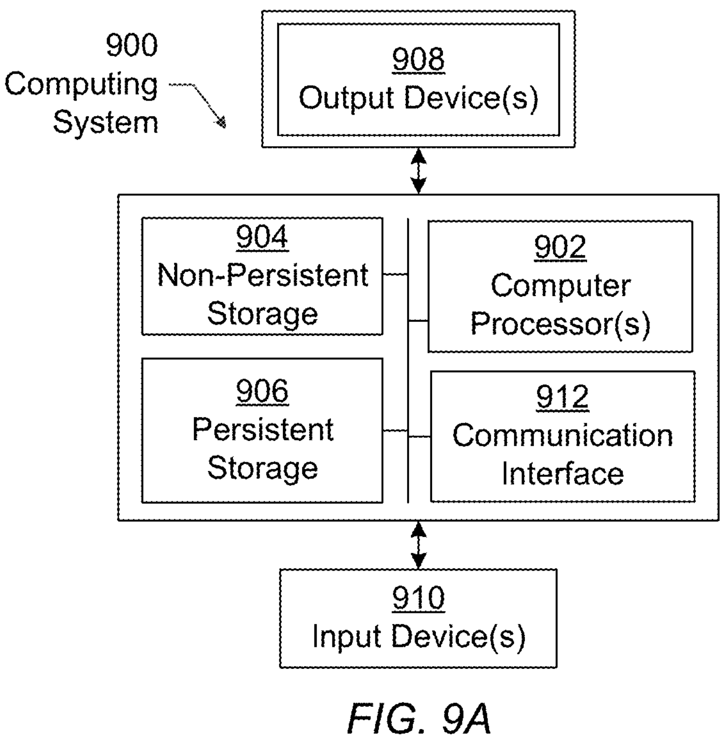
FIG. 9A and FIG. 9B show a computing system in accordance with one or more embodiments of the invention.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 9A, the computing system (900) may include one or more computer processors (902), non-persistent storage (904), persistent storage (906), a communication interface (912) (e.g., Bluetooth interface, infrared interface, network interface, optical interface, etc.), and numerous other elements and functionalities that implement the features and elements of the disclosure. The computer processor(s) (902) may be an integrated circuit for processing instructions. The computer processor(s) may be one or more cores or micro-cores of a processor. The computer processor(s) (902) includes one or more processors. The one or more processors may include a central processing unit (CPU), a graphics processing unit (GPU), a tensor processing unit (TPU), combinations thereof, etc.

The input devices (910) may include a touchscreen, keyboard, mouse, microphone, touchpad, electronic pen, or any other type of input device. The input devices (910) may receive inputs from a user that are responsive to data and messages presented by the output devices (908). The inputs may include text input, audio input, video input, etc., which may be processed and transmitted by the computing system (900) in accordance with the disclosure. The communication interface (912) may include an integrated circuit for connecting the computing system (900) to a network (not shown) (e.g., a local area network (LAN), a wide area network (WAN) such as the Internet, mobile network, or any other type of network) and/or to another device, such as another computing device.

Further, the output devices (908) may include a display device, a printer, external storage, or any other output device. One or more of the output devices may be the same or different from the input device(s). The input and output device(s) may be locally or remotely connected to the computer processor(s) (902). Many different types of computing systems exist, and the aforementioned input and output device(s) may take other forms. The output devices (908) may display data and messages that are transmitted and received by the computing system (900). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

Figure 9B:
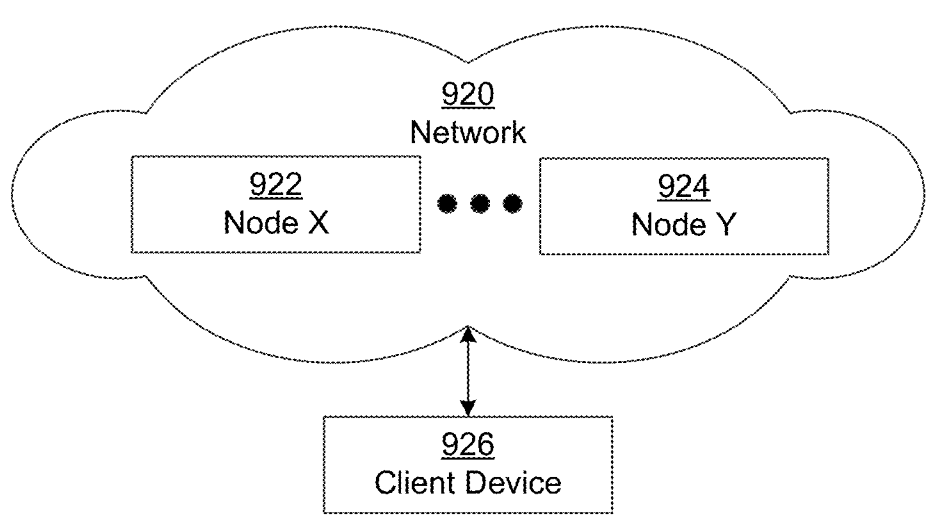

The computing system (900) in FIG. 9A may be connected to or be a part of a network. For example, as shown in FIG. 9B, the network (920) may include multiple nodes (e.g., node X (922), node Y (924)). Each node may correspond to a computing system, such as the computing system shown in FIG. 9A, or a group of nodes combined may correspond to the computing system shown in FIG. 9A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (900) may be located at a remote location and connected to the other elements over a network.

The nodes (e.g., node X (922), node Y (924)) in the network (920) may be configured to provide services for a client device (926), including receiving requests and transmitting responses to the client device (926). For example, the nodes may be part of a cloud computing system. The client device (926) may be a computing system, such as the computing system shown in FIG. 9A. Further, the client device (926) may include and/or perform all or a portion of one or more embodiments.

The computing system of FIG. 9A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A computer-implemented method comprising:

obtaining a plurality of real-world images in a real-world scene;

generating a panoramic image from the plurality of real-world images, wherein generating the panoramic image comprises:

generating a partial panoramic image from the plurality of real-world images, and completing, via a panoramic completion network, the partial panoramic image to generate a low dynamic range image, wherein generating the panoramic image is from the low dynamic range image;

generating a source light representation of the real-world scene from the panoramic image of the real-world scene;

augmenting the real-world scene in an object representation of the real-world scene to generate an augmented scene;

selecting a target lighting representation identifying a target light source;

processing the augmented scene to generate a plurality of augmented image buffers;

processing, by a neural deferred rendering model, the plurality of augmented image buffers, the source lighting representation, and the target lighting representation to generate an augmented image having a lighting appearance according to the target light source; and outputting the augmented image.

2. The computer-implemented method of claim 1, wherein the neural deferred rendering model further uses the real-world scene to generate the augmented image.

3. The computer-implemented method of claim 1, wherein generating the panoramic image comprises:

for each image pixel of a first plurality of image pixels in a real-world image of the plurality of real-world images:

mapping the image pixel to a location in the object representation of the real-world scene, determining a distance to the object representation, and transforming the image pixel to a corresponding panoramic pixel at a corresponding position in the panoramic image.

4. The computer-implemented method of claim 3, wherein generating the panoramic image further comprises:

detecting that a second plurality of pixels of the plurality of real-world images are mapped to a same corresponding position in the panoramic image, generating a combined color value for the corresponding panoramic pixel at the same corresponding position from the second plurality of pixels, and wherein transforming the image pixel for the second plurality of pixels comprises using the combined color value for the corresponding panoramic pixel.

5. The computer-implemented method of claim 1, further comprising:

cropping a plurality of training panoramic images to match a view of the panoramic image to generate a plurality of cropped images;

completing, by the panoramic completion network, the plurality of cropped images to obtain a plurality of predicted images;

generating a loss based on a comparison of the plurality of training panoramic images with the plurality of predicted images; and updating the panoramic completion network using the loss.

6. The computer-implemented method of claim 1, wherein generating the augmented scene comprises at least one selected from a group consisting of moving an actor in the augmented scene from the real-world scene, adding the actor to the augmented scene as compared to the real-world scene, and removing the actor from the augmented scene as compared to the real-world scene.

7. The computer-implemented method of claim 1, wherein generating the source lighting representation is performed using a lighting estimator estimating a sky dome from the panoramic image, wherein the source lighting representation is the sky dome.

8. The computer-implemented method of claim 7, further comprising:

downscaling a plurality of high-dynamic range training panoramic images to generate a plurality of low-dynamic range training panoramic images;

processing, by the lighting estimator, the plurality of low-dynamic range training panoramic images to generate a plurality of predicted sky domes;

generating a loss based on a comparison of the plurality of high-dynamic range training panoramic images to the plurality of predicted sky domes; and updating the lighting estimator according to the loss.

9. The computer-implemented method of claim 1, wherein processing the augmented scene to generate the plurality of augmented image buffers is performed by a physics-based renderer.

10. The computer-implemented method of claim 1, further comprising:

training a virtual driver of an autonomous system using the augmented image.

11. A computer-implemented method, comprising:

generating a source light representation of a real-world scene from a panoramic image of the real-world scene, wherein generating the source lighting representation is performed using a lighting estimator estimating a sky dome from the panoramic image, wherein the source lighting representation is the sky dome;

determining a location of a peak amplitude in the sky dome;

determining an azimuth, an elevation, and an intensity of a sky dome light source from the location of the peak amplitude;

modifying at least one of the azimuth, the elevation, and the intensity to select a target light source;

generating a target lighting representation based on the target light source;

augmenting the real-world scene in an object representation of the real-world scene to generate an augmented scene;

processing the augmented scene to generate a plurality of augmented image buffers;

processing, by a neural deferred rendering model, the plurality of augmented image buffers, the source lighting representation, and the target lighting representation to generate an augmented image having a lighting appearance according to the target light source; and outputting the augmented image.

12. The computer-implemented method of claim 11, wherein generating the target lighting representation comprises regressing the target light source to generate a target sky dome as the target lighting representation.

13. A system comprising:

memory; and a computer processor comprising computer readable program code for performing operations comprising:

obtaining a plurality of real-world images in a real-world scene, generating a panoramic image from the plurality of real-world images, wherein generating the panoramic image comprises:

generating a partial panoramic image from the plurality of real-world images, and completing, via a panoramic completion network, the partial panoramic image to generate a low dynamic range image, wherein generating the panoramic image is from the low dynamic range image, generating a source light representation of the real-world scene from the panoramic image of the real-world scene, augmenting the real-world scene in an object representation of the real-world scene to generate an augmented scene, selecting a target lighting representation identifying a target light source, processing the augmented scene to generate a plurality of augmented image buffers, processing, by a neural deferred rendering model, the plurality of augmented image buffers, the source lighting representation, and the target lighting representation to generate an augmented image having a lighting appearance according to the target light source, and outputting the augmented image.

14. The system of claim 13, wherein the neural deferred rendering model further uses the real-world scene to generate the augmented image.

15. The system of claim 13, wherein generating the panoramic image comprises:

for each image pixel of a first plurality of image pixels in a real-world image of the plurality of real-world images:

mapping the image pixel to a location in the object representation of the real-world scene, determining a distance to the object representation, and transforming the image pixel to a corresponding panoramic pixel at a corresponding position in the panoramic image.

16. A non-transitory computer readable medium comprising computer readable program code for performing operations comprising:

obtaining a plurality of real-world images in a real-world scene;

generating a panoramic image from the plurality of real-world images, wherein generating the panoramic image comprises:

generating a partial panoramic image from the plurality of real-world images, and completing, via a panoramic completion network, the partial panoramic image to generate a low dynamic range image, wherein generating the panoramic image is from the low dynamic range image;

generating a source light representation of a real-world scene from a panoramic image of the real-world scene;

augmenting the real-world scene in an object representation of the real-world scene to generate an augmented scene;

selecting a target lighting representation identifying a target light source;

processing the augmented scene to generate a plurality of augmented image buffers;

processing, by a neural deferred rendering model, the plurality of augmented image buffers, the source lighting representation, and the target lighting representation to generate an augmented image having a lighting appearance according to the target light source; and outputting the augmented image.

* * * * *